United States Patent [19]
Jamzadeh et al.

[11] Patent Number: 5,307,906
[45] Date of Patent: May 3, 1994

[54] COMBINED MECHANICALLY/HYDRAULICALLY ACTUATED BRAKING SYSTEM WHICH PROVIDES TACTILE FEED-BACK

[75] Inventors: Fereydoon Jamzadeh, Indianapolis; Arthur L. Grew, Jr., Plainfield, both of Ind.

[73] Assignee: General Motors Corporation, Detroit, Mich.

[21] Appl. No.: 13,512

[22] Filed: Feb. 4, 1993

[51] Int. Cl.⁵ ............................................. F16D 65/14
[52] U.S. Cl. ................................. 188/106 F; 188/71.5; 188/71.6; 188/72.6; 188/264 E; 188/106 P; 188/360; 303/9.61; 303/50
[58] Field of Search .................. 303/50, 9.61, 2–3; 188/106 F, 72.6, 106 P, 358, 359, 105, 360, 264 E, 71.5, 71.6; 91/369.1, 391 R, 391 A, 376 R; 74/471 R

[56] References Cited

U.S. PATENT DOCUMENTS

| | | | |
|---|---|---|---|
| 1,991,603 | 2/1935 | Dick | 188/106 P |
| 2,065,168 | 12/1936 | Brown | 188/106 PX |
| 2,218,191 | 10/1940 | Dick | 188/360 |
| 2,499,775 | 3/1950 | Piganeau | 188/360 |
| 2,809,725 | 10/1957 | Ayers, Jr. | 91/391 A |
| 3,353,635 | 11/1967 | Kotoucek | 188/106 FX |
| 3,670,854 | 6/1972 | Maci | 188/106 FX |
| 4,462,300 | 7/1984 | Belart | 91/391 R X |
| 4,462,487 | 7/1984 | Warwick et al. | 188/106 FX |
| 4,482,192 | 11/1984 | Leiber | 303/114.1 X |
| 4,553,650 | 11/1985 | Warwick et al. | 188/106 FX |

*Primary Examiner*—Douglas C. Butler
*Attorney, Agent, or Firm*—Donald F. Scherer

[57] ABSTRACT

A braking system for a vehicle. The braking system provides continuous tactile feed back through the brake pedal to the operator of the vehicle that conforms to the degree to which the vehicle brakes are being applied so that the tactile feed-back to the operator conforms to the visual and kinesthetic input received by the operator. The braking system has a brake pedal that is mounted to be depressed in response to a force applied thereto by the vehicle operator. The braking system incorporates both a mechanical brake actuating mechanism and a hydraulic brake actuating mechanism. The braking system provides for selective actuation of the mechanical brake actuating mechanism sequentially in advance of the hydraulic brake actuating mechanism when the brake pedal is depressed. A linkage assembly is incorporated in the mechanical brake actuating mechanism. The linkage assembly provides tactile feed-back to the brake pedal throughout the range of operation of said braking system. Subsequent to the mechanical actuation of the braking system, continued depression of the brake pedal actuates the hydraulic brake actuating mechanism. This sequencing is provided by a brake actuating system embodying the concepts of the present invention and is responsible for the reliable tactile feed-back reflected in the brake pedal.

12 Claims, 12 Drawing Sheets

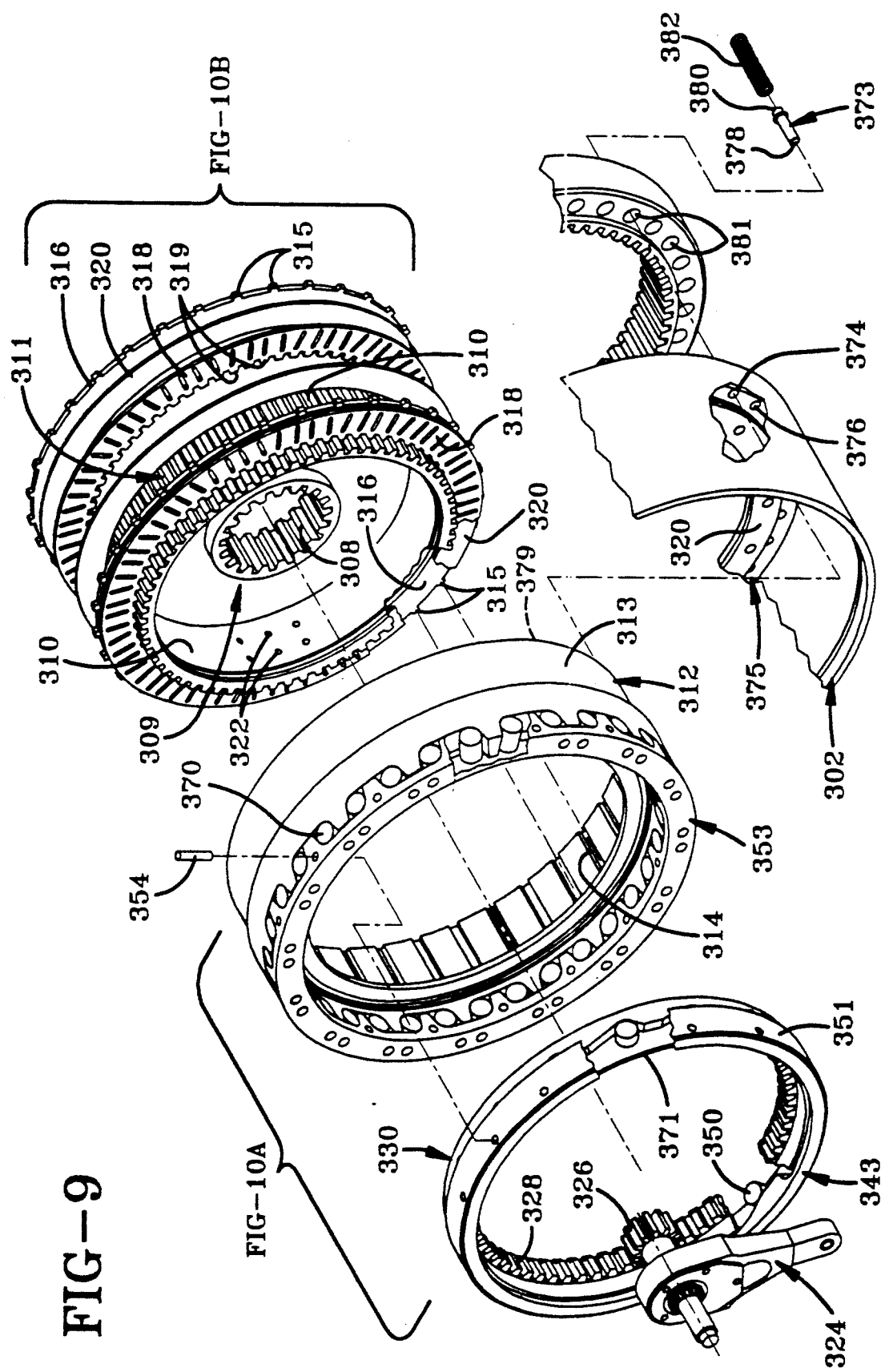

COMBINED MECHANICALLY/HYDRAULICALLY ACTUATED BRAKING SYSTEM WHICH PROVIDES TACTILE FEED-BACK

TECHNICAL FIELD

The present invention relates generally to vehicular braking systems. More particularly, the present invention relates to an improved actuating assembly for vehicular braking systems that may incorporate self-energization, the braking system being capable of actuation by mechanical and/or hydraulic means, and even a combination thereof, throughout the braking operation. Specifically, the present invention relates to a combined mechanically and hydraulically actuated vehicular braking system that provides continuous tactile feed-back to the vehicle operator through the brake pedal, the magnitude of the feed-back pressure reflecting the magnitude of the braking action.

BACKGROUND OF THE INVENTION

The present invention is particularly adapted for use in conjunction with torque transfer devices in the nature of interleaved, multi-plate, brake packs that are actuated by a combination of mechanical and hydraulic means.

Torque transfer devices in the nature of such multi-plate, brake packs are often employed in conjunction with individual transmission output shafts, or the axle assemblies connected thereto. Such brake packs are generally subjected to axial compression in order to effect the desired braking action in response to depression of the brake pedal. That is, compression of the multiple, interleaved torque plates, with friction disks disposed therebetween, effects the torque transfer between the rotating output shaft and a fixed member secured to the vehicle. It is this torque transfer which actually slows the vehicle.

Combined mechanical and hydraulic actuation of braking systems have been available for many years. The combination advantageously actuates the brake mechanism with relatively modest foot pressure. However, when hydraulic actuation, and/or self energization is employed, the braking system is particularly susceptible to feed-back that might be erroneously interpreted. That is, the braking pressure applied by the vehicle operator, at least as the vehicle operator's foot receives feed-back which reflects the pressure required to effect the braking operation, appears to be disproportionately less than the operator might expect for the braking action desired.

Accordingly, when hydraulic actuation is initiated—particularly if the system initiates hydraulic actuation prior to mechanical actuation—brake pedal effort drops so rapidly that the operator is unable to respond with the required reduction of foot pressure to the brake pedal. In fact, the operator typically responds to the diminished tactile feed-back by applying even greater pressure to the foot pedal, thereby applying an even greater braking force. Under the circumstances of attempting to slow, or to bring the vehicle to a stop, the significant, instantaneous reduction of foot pedal resistance is interpreted as at least a partial loss of braking ability, which explains the operator' normal reaction of applying an even greater amount of pressure to the brake pedal.

The foot pressure applied to stroke, or depress, the brake pedal during the initial actuation of the braking operation is progressively resisted by the prior known brake pedal return spring, as represented by portion 10 of the curve depicted in FIG. 1. After the mechanical apply lever assembly, or the apply shaft, has rotated approximately eight degrees in prior art systems, hydraulic actuation of the braking operation is initiated. The tactile feed-back pressure thereupon drops, as reflected by portion 11 of the curve depicted in FIG. 1, to the extremely modest level of resistance afforded by a regulating spring that is customarily incorporated in the hydraulic brake apply valve. This low level resistance continues through virtually the entire rotational range of the apply lever, or shaft, as represented by portion 12 of the aforesaid curve.

SUMMARY OF THE INVENTION

It is, therefore, a primary object of the present invention to provide an improved actuating assembly for a vehicle braking system that employs a combined mechanical and hydraulic actuation system.

It is another object of the present invention to provide an actuating assembly for a vehicle braking system, as above, that initially utilized the mechanical actuation and thereafter utilizes both the mechanical and the hydraulic actuation over the full brake operating range.

It is a further object of the present invention to provide an improved actuating assembly for a vehicle braking system, as above, that utilizes a novel feed-back arrangement in the link mechanism by which the brake pedal is connected to at least the mechanical brake actuator in order to effect the desired tactile feed-back to the vehicle operator.

It is still another object of the present invention to provide an improved actuating system for a vehicular braking system, as above, that utilizes a biasing means within the feed-back arrangement.

It is yet another object of the present invention to provide an improved actuating system for a vehicular braking system, as above, wherein a stop means is employed to limit the range of motion permitted by the biasing means within the feed-back arrangement.

It is an even further object of the present invention to provide an improved actuating system for vehicular braking system, as above, that utilizes the spool member in the brake apply valve to provide an additional feed-back force component that is proportional to the pressure of the hydraulic brake fluid acting within the brake apply valve.

These and other objects of the invention, as well as the advantages thereof over existing and prior art forms, which will be apparent in view of the following detailed specification, are accomplished by means hereinafter described and claimed.

In general, a brake actuating assembly embodying the concepts of the present invention initially utilizes a mechanical brake actuating mechanism. Associated link means are provided to actuate the mechanical brake actuating mechanism in response to initial depression of the brake pedal by the vehicle operator.

The brake actuating assembly also utilizes a hydraulic brake apply valve. A novel feed-back arrangement is incorporated in the linkage assembly by which the mechanical brake actuating mechanism is applied in response to the initial depression of the brake pedal, and preferably after actuation of the coolant valve has been initiated. This sequence provides tactile feed-back through the brake pedal to the vehicle operator throughout the entire range within which the braking system is operated.

The present invention is described in conjunction with one exemplary embodiment of a braking system which is deemed sufficient to effect a full disclosure of the subject invention. The exemplary braking system is described in detail without attempting to show all of the various forms and modifications in which the invention might be embodied; the invention being measured by the appended claims and not by the details of the specification.

BRIEF DESCRIPTION OF THE DRAWINGS

FIG. 9 is an enlarged, partially exploded perspective of the brake apply assembly depicted in FIGS. 7 and 8 removed from the housing, and with selected components of the brake apply assembly disposed in their juxtaposed, operative relationship;

DESCRIPTION OF AN EXEMPLARY EMBODIMENT

Figure 1:
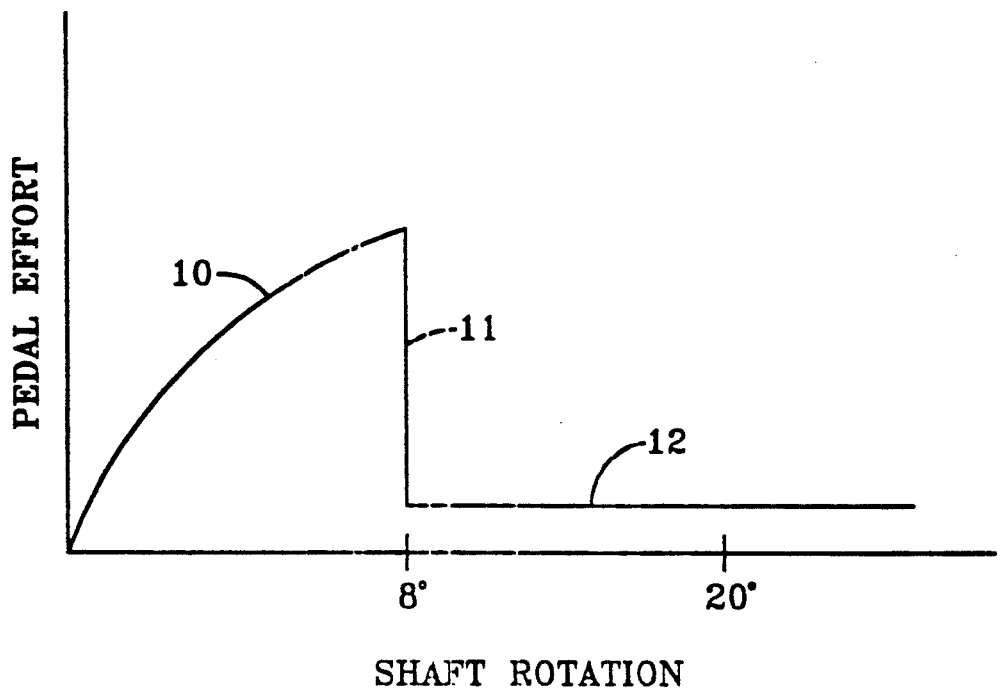
FIG. 1 is a graphic representation which depicts the feed-back to the vehicle operator resulting from a prior art braking system that does not employ an actuating assembly that incorporate the concepts of the present invention; and, FIG. 2 is a schematic drawing representing the major components utilized in a braking system actuating mechanism embodying the concepts of the present invention, the arrangement depicting the system under the condition that no pressure is being applied to the brake pedal—as would be the situation when the vehicle is moving under power.

One representative form of a braking system embodying the concepts of the present invention is designated generally by the numeral 10 on the accompanying drawings. The representative braking system 10, schematically depicted in FIG. 2, includes brake packs 11 (hereinafter shown and described in conjunction with FIGS. 7, 8 and 11) that are operated by a hereinafter described, combined hydraulic and mechanical brake apply assembly 300. Actuation of the brake apply assembly 300 is controlled by the vehicle operator through a brake pedal assembly 12. The brake pedal assembly 12 presents a conventional foot pedal 13 by which pivotally to move a pedal arm 14 that is conveniently mounted for pivotal movement, as at 15. One end of a connecting arm 16 is pivotally connected to the pedal arm 14 of the brake pedal assembly 12 by a pivot pin 18. The other end of the connecting arm 16 is pivotally connected to the input lever portion 19 of a rocker arm 20 by a pivot pin 21. The rocker arm 20 serves as the input divider by which to effect the desired sequential and/or simultaneous actuation of the combined mechanical and hydraulic brake apply assembly 300. The actuation of both the mechanical and the hydraulic aspects of the brake apply system 300 by the rocker arm 20 will be hereinafter described in detail.

In addition, to the input lever portion 19, the rocker arm 20 also presents first and second output lever portions 22 and 23, respectively. The output lever portions 22 and 23 extend outwardly from the shaft 24 on which the rocker arm 20 is mounted for rotation in response to actuation of the foot pedal 13.

The first output lever portion 22 actuates the combined mechanical and hydraulic brake apply assembly 300 through the brake apply valve 100—which sequentially stages the flow of coolant to the brake packs 11 (hereinafter shown and described in conjunction with FIGS. 7, 8 and 11) upon initial depression of the brake pedal 13. The brake apply valve 100 also controls the flow of fluid which effects the hydraulic phase by which the combined mechanical and hydraulic brake apply assembly 300 is actuated. Although it will hereinafter become apparent that the brake packs 11 are initially applied by mechanical actuation, continued depression of the brake pedal 13 effects hydraulic actuation of the brake packs 11. As such, the vehicular brake packs 11 are frictionally engaged in response to continued depression of the brake pedal 13, whether by mechanical or hydraulic means. The structural description, as well as the aforesaid functions, of the brake apply valve 100 will be hereinafter described in detail. For the present it should be understood that the first output lever portion 22 actuates the brake apply valve 100 by means of a low friction roller 25 presented from the distal end portion of the first output lever portion 22.

The second output lever portion 23 of the rocker arm 20 effects the mechanical actuation of the combined mechanical and hydraulic brake apply assembly 300. As such, the second output lever portion 23 actuates the brake apply assembly 300 through a linkage assembly designated generally by the numeral 26 on the drawings. Specifically, the distal end portion of the second output lever portion 23 terminates in a cam surface 28 which interact with a low friction follower 29 mounted on the input end 30 of an oscillating beam 31. The output end 32 of the oscillating beam 31 operatively engages the input end 33 of a feed-back link 35.

Figure 2:
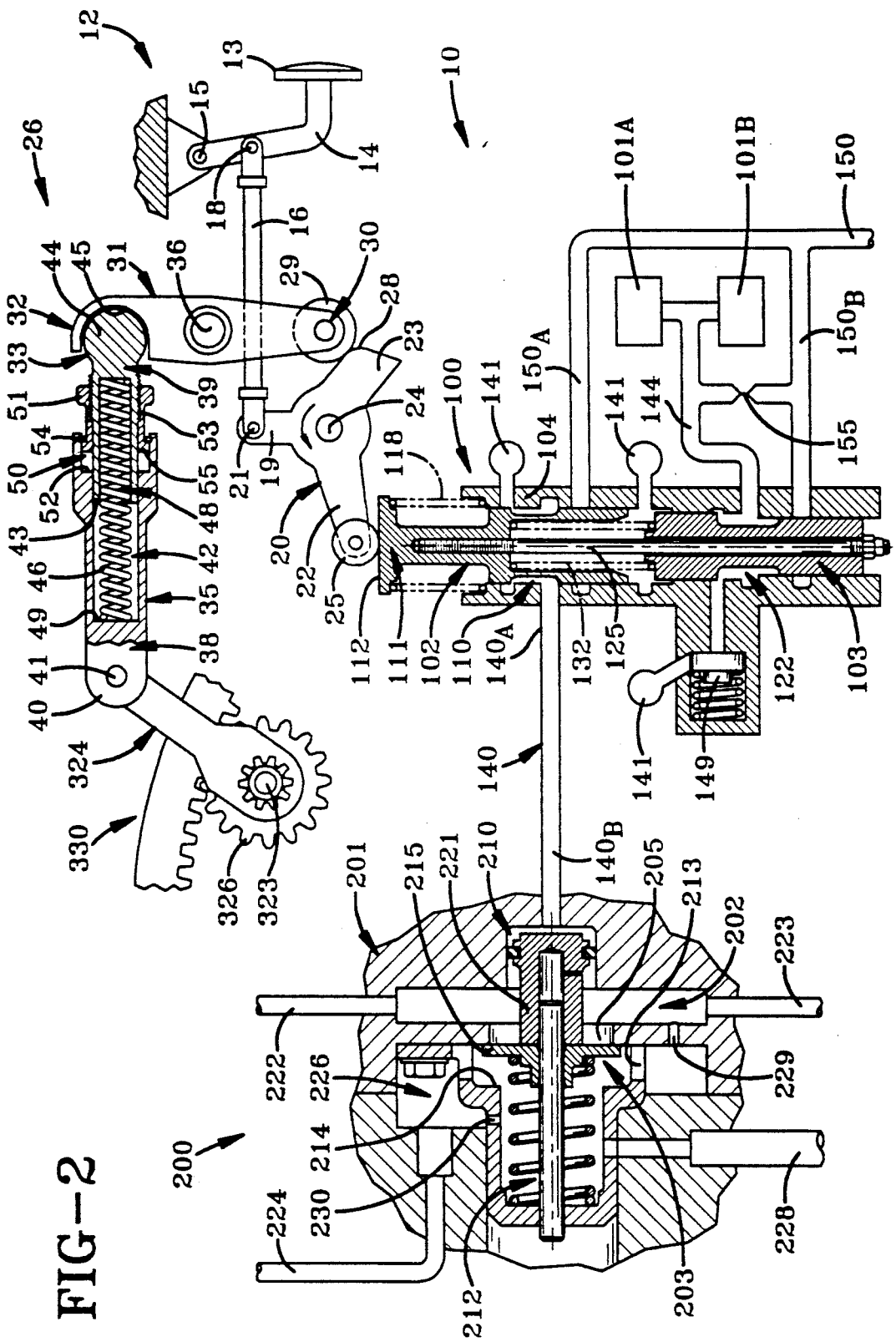

As depicted in FIG. 2, the oscillating beam 31 is mounted for seesaw movement on a shaft 36 that is preferably offset toward the output end 32 of the lever 31. Hence, the oscillating beam 31 is asymmetrically mounted and is, therefore, capable of applying a mechanical advantage to the operating forces transferred therethrough.

The feed-back link 35 preferably has telescopic first and second portions 38 and 39 that are spring loaded to provide a biasing resistance against telescopic compression. The base 40 of the first telescopic portion 38 may be pivotally connected, as by a pin 41, to an apply lever assembly 324 that is hereinafter more fully described in conjunction with the combined mechanical and hydraulic apply assembly 300. The first telescopic portion 38 also incorporates the receiving chamber 42 within which a plunger 43 on the second telescopic portion 39 may be received for reciprocating axial translation.

As shown, the input end 33 of the second telescopic portion 39 may terminate in a ball 44 that is received within a socket 45 provided on the output end 32 of the oscillating beam 31. That ball and socket joint comprises the operative connection between the input end 33 of the feed-back link 35 and the output end 32 of the asymmetrically mounted oscillating beam 31. The ball and socket connection—in conjunction with the pinned connection of the first telescopic portion 38 with the apply lever assembly 324—assures that the telescopic portion 38 and 39 will remain aligned and that the second telescopic portion 39 will reciprocate relative to the first telescopic portion 38 in response to the seesaw movement of the oscillating beam 31 about the shaft 36.

A spring 46 serves to provide the desired biasing resistance against compressive insertion of the plunger 43 into the receiving chamber 42. The receiving chamber 42 has a radially extending cavity 50 within which the rim portion 55 of an adjusting member 51 is slidably received. The adjusting member 51 is selectively positionable along the second telescopic portion 39 of the feed-back link 35, as by the threaded connection 53. The rim portion 55 of the adjusting member 51 is slidably received within the cavity 50. A lock ring 54 is secured within the cavity 50 to abut the rim portion 55 and thereby limit the rightward movement, as oriented in FIGS. 2-5, of the second telescopic portion 39 within the first telescopic portion 38 in order to control the preload in the spring 46. Thus, in the assembled position the spring 46 is trapped in a recess 48 formed in the plunger 43. In practice this precompression, or as-assembled, load on the spring 46 is preferably equal to the load in the compression springs 382 of the brake assembly 300. However, recognizing that this load will not always be obtainable at assembly due to tolerances the spring 46 is compressed as the beam 31 is rotated to the position shown in FIG. 4 such that the load on the spring 46 is essentially balancing the mechanical reaction force within the brake assembly.

As shown, the plunger 43 contains the axial recess 48, and the spring 46 is received within the recess 48 and engages the opposed base 49 of the receiving chamber 42 in the first telescopic portion 38. A stop surface 52 is provided at one end of cavity 50 in axial alignment with the rim portion 55 which will engage the stop surface 52 at the desired limit of spring compression thereby controlling the maximum extent to which the second telescoping portion 39 can be received within the first telescopic portion 38.

The braking system 10 also employs a brake coolant valve 200. The brake coolant valve 200 directs the actual flow of the coolant fluid to the brake packs 11 in response to a signal pressure from the brake apply valve 100. The brake coolant valve 200 and the means by which it is actuated will also be hereinafter more fully explained.

Figure 3:
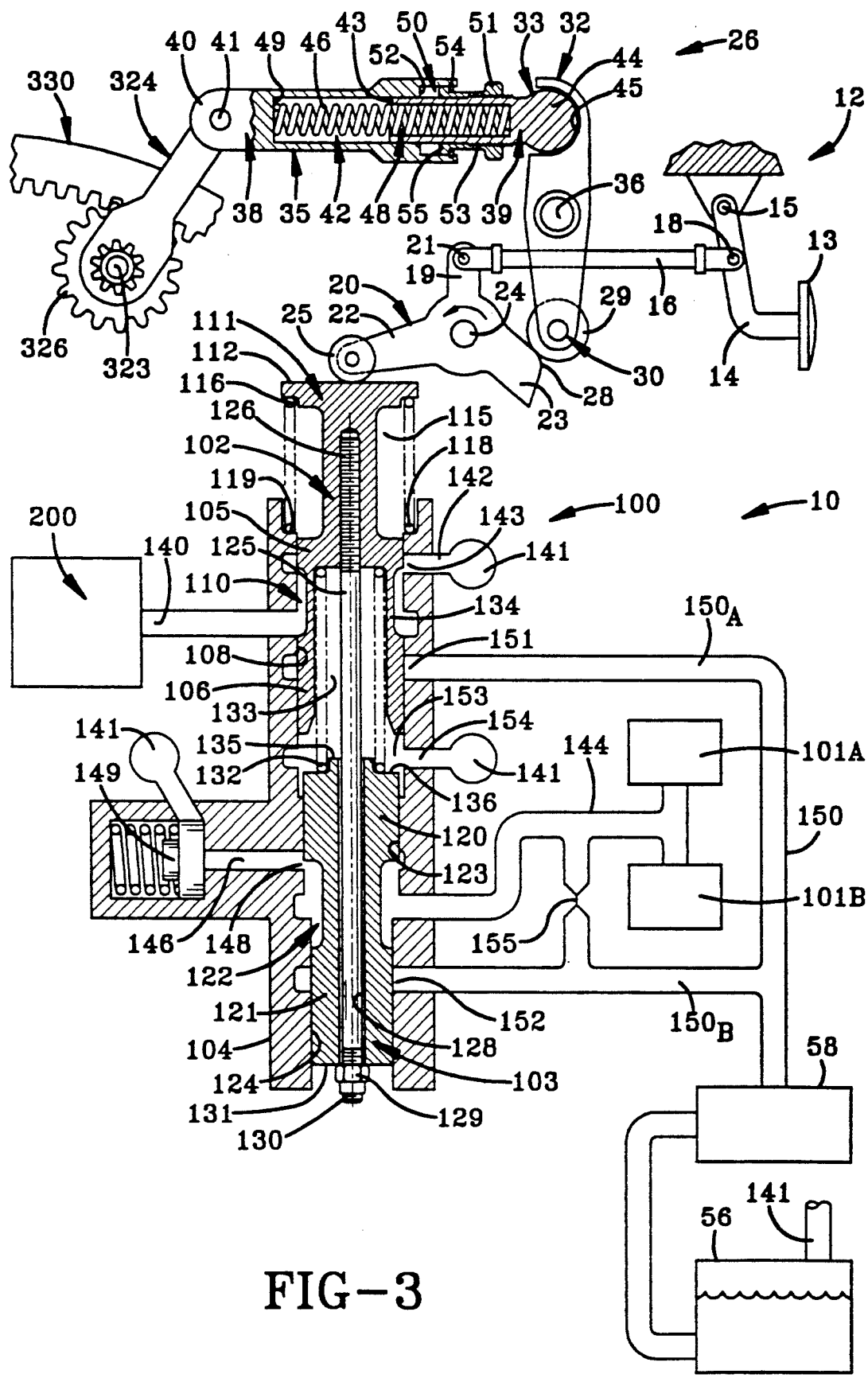
FIG. 3 is an enlarged portion of FIG. 2 depicting the brake apply valve in schematic, axial cross section.
Figure 4:
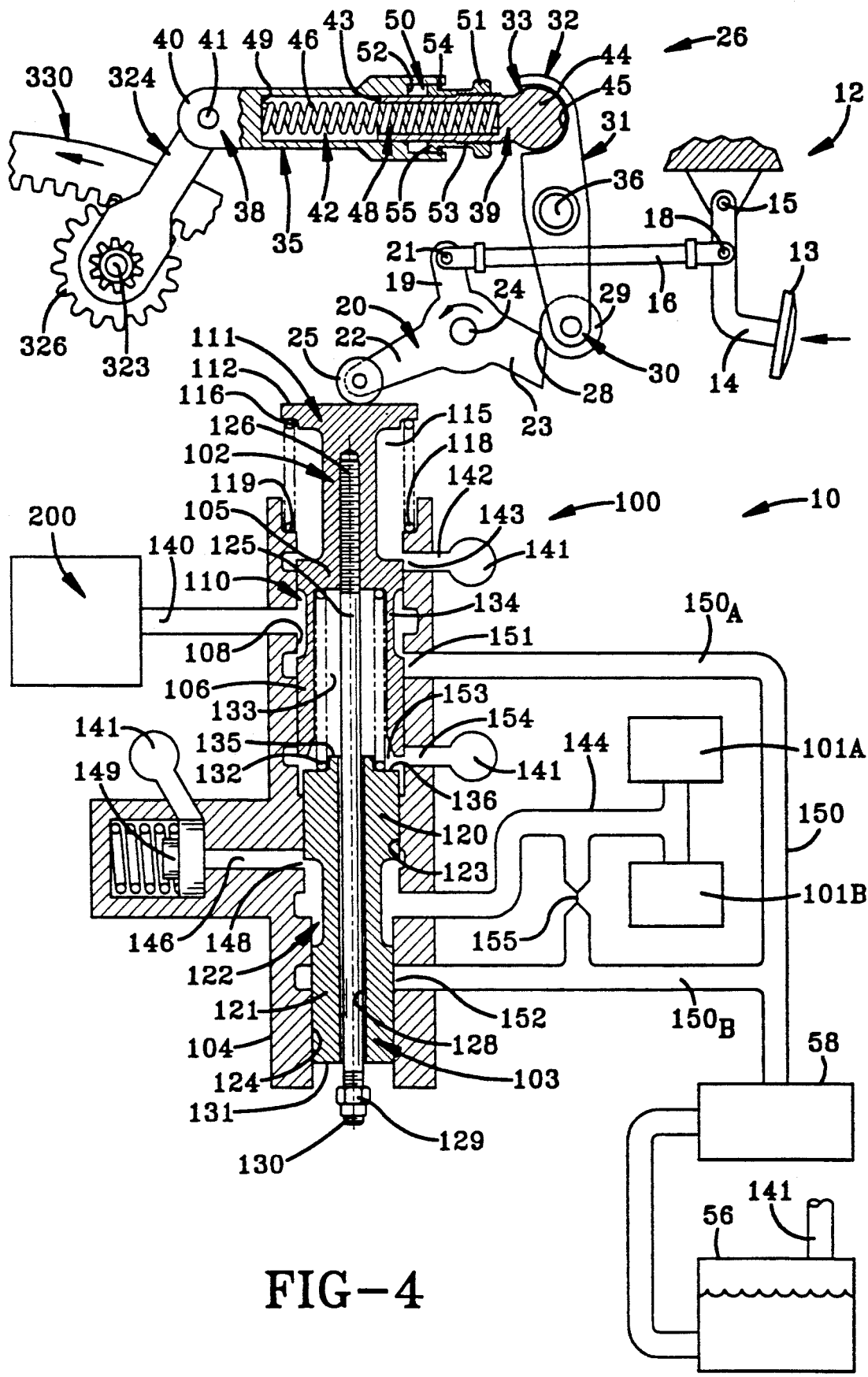
FIG. 4 is an enlarged portion of FIG. 2 depicting the brake apply valve in schematic, axial cross section and with the components in the brake apply valve disposed in response to the initial depression of the brake pedal by the vehicle operator.
Figure 5:
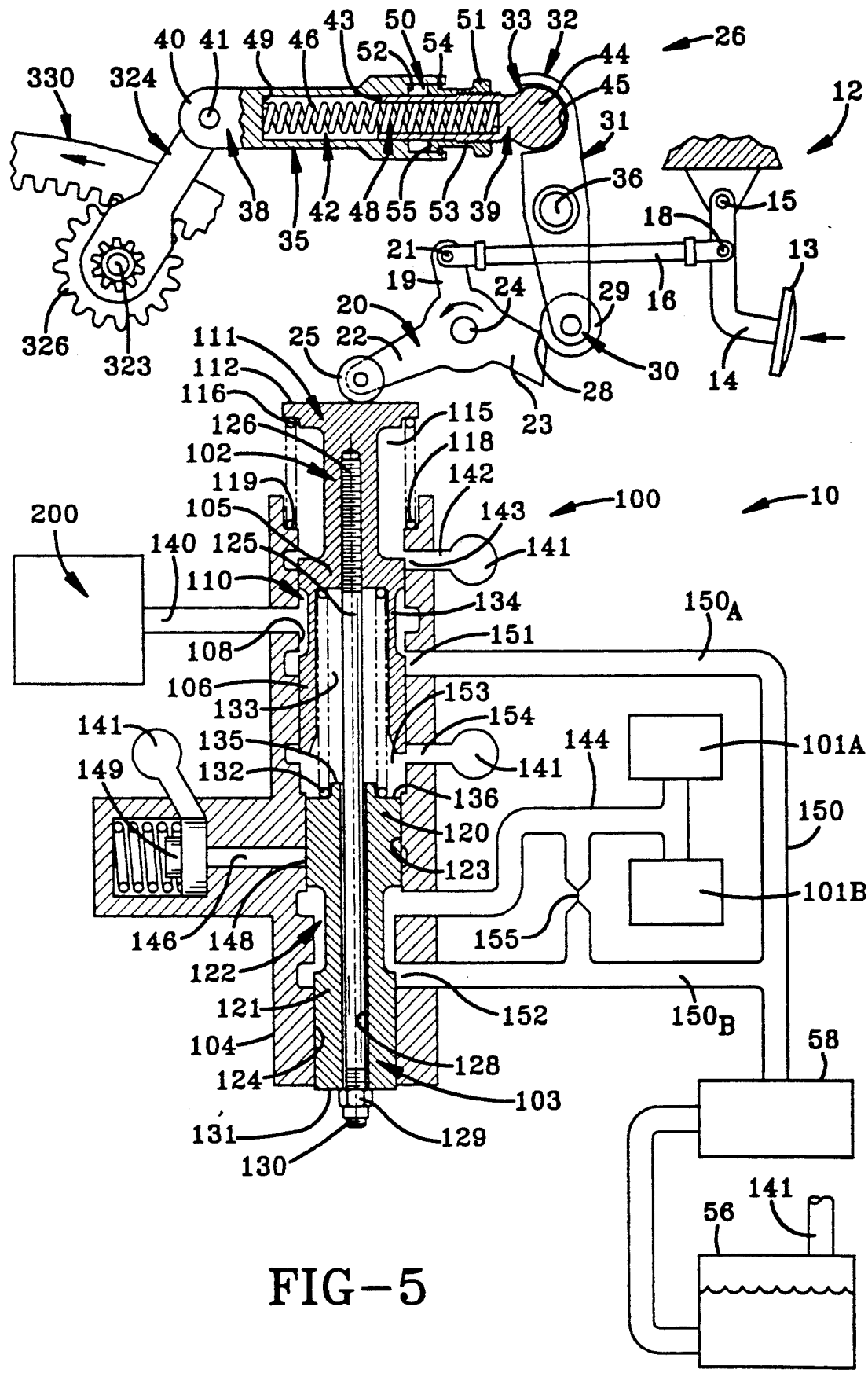
FIG. 5 is a view similar to FIGS. 3 and 4, but depicting the component of the brake apply valve disposed in response to continued depression of the brake pedal subsequent to initiation of the mechanical actuation assembly.

It should be noted that the hydraulic fluid employed to actuate the brakes may also be the source of the fluid employed to cool the brakes, and that fluid may be stored in a reservoir 56, as best seen in FIGS. 3-5. A pump 58 is generally employed to supply hydraulic fluid from the reservoir 56 to the brake apply valve 100 at the desired mainline pressure. The means by which the present brake cooling system 10 supplies a pre-cooling bath to the brake packs 11 will become apparent by virtue of the detailed description of the brake apply valve 100 and the brake coolant valve 200 which follows.

As will already have been observed, there are a several components that may be effectively employed in the overall brake system 10, and which have already been mentioned but which have not yet been described—viz.: the brake apply valve 100, the brake coolant valve 200 and the combined mechanical and hydraulic brake apply system 300. Those peripheral components will, for overall clarity, now be individually described. In addition to the structural description of those peripheral components, the operation of each will, as appropriate, also be included as to each of the those peripheral components in conjunction with the structural description thereof. There will, of course, be a brief description as to the operation of the overall braking system 10, which emphasizes the novel aspects of the present invention, at the end of the specification. However, in order to preclude the necessity for an overly cumbersome description of the invention, and its operation, at the end of the specification, the election was made to provide an operational description for each component, as that component is described.

Brake Apply Valve

Turning now to an explanation of the brake apply valve 100, it must be understood that at some predetermined stage in the operation of the braking system 10 the brake apply valve 100 will, at least, assist in controlling the application of pressurized hydraulic fluid, such as oil, to the cylinders 101 which operate the brake packs 11 of a vehicle. Initially, however, the brake apply valve 100 provides only a brake apply signal pressure to operate a brake coolant valve 200 which, in turn, controls the application of a coolant—normally cooled hydraulic fluid available from the same source as the hydraulic fluid flowing to, or through, the brake apply valve 100—to the engageable torque transfer device employed by the brake packs 11 of the vehicle.

As most clearly depicted in FIGS. 3 through 5, the brake apply valve 100 employs pair of axially aligned, and spaced, first and second spool members 102 and 103 that are received within a housing 104 for axial translation. The first spool member 102 has a pair of axially spaced, first and second cylindrical lands 105 and 106, respectively, of equal diameter which slidingly engage a first, cylindrical, interior wall portion 108 of the housing 104 to define a brake apply signal chamber 110 between the lands 105 and 106.

The first spool member 102 has a head portion 111, the outwardly directed face 112 of which may be engaged by a low friction roller 25 presented from the output lever arm 22 on the rocker 20. The roller 25 applies a displacing force to the spool member 102 in direct response to the application of force to the brake pedal 13 by the vehicle operator. This result is effected by virtue of the connecting arm 16 which rotates the rocker 20 as a direct result of depressing the foot pedal 13.

The head portion 111 of the first spool member 102 may be annularly recessed, as at 115, to present an annular rim 116 that is engaged by a compression, return spring 118 which acts between the opposed, annular rim 116 and a shelf 119 presented from the housing 104. The return spring 118 applies a modest biasing resistance to translation of the first spool member 102, and that resistance may be reflected against depression of the brake pedal 12 in order to provide the initial tactile feed-back to the operator. The return spring 118 also functions to maintain the first spool member 102 in, or to return the first spool member 102 to, the unactuated state depicted in FIGS. 2 and 3.

The second spool member 103 has a pair of axially spaced, first and second cylindrical lands 120 and 121 of unequal diameter. The lands 120 and 121 are slidably disposed in sealing engagement with a stepped diameter bore in the housing 104. Specifically, the lands 120 and 121 cooperate with the interior of the housing 104 to define a brake apply chamber 122 therebetween. The first land 120, which is of greater diameter than the second land 121, slidingly engages a second, cylindrical, interior wall portion 123 presented from the housing 104, and the second land 121 slidingly engages a third, cylindrical, interior wall portion 124 presented from the housing 104. The functional purpose of the differential areas presented to the brake apply chamber 122 by the first and second lands 120 and 121, respectively, will be hereinafter more fully described.

A connecting rod 125 is anchored in the first spool member 102, as by the threaded attachment 126, and the connecting rod 125 extends slidingly through an axial bore 128 in the second spool member 103 to terminate in a retaining cap 129 that may also be secured to the connecting rod 125, as by the threaded attachment 130. The retaining cap 129 engages one end face 131 on the second spool member 103 to delineate the limit to which the second spool member 103 can separate axially from the first spool member 102.

A regulating compression spring 132 is interposed between the first and second spool members 102 and 103. As depicted, the interior of the first spool member 102 may be axially recessed, as at 133, such that the second land 106 is supported from a skirt portion 134. The regulating spring 132 is received within the axial recess 133 and extends axially outwardly therefrom to engage a centering pedestal 135 that extends axially outwardly from the other end face 136 of the second spool member 103. The functional operation achieved by having the regulating spring 132 continuously bias the two spool members 102 and 103 apart will also be hereinafter more fully described.

The unactuated disposition of the components in the brake apply valve 100 is determined by the unopposed biasing action of the return and regulating springs 118 and 132, respectively, as represented in FIGS. 2 and 3. In the unactuated state of the brake apply valve 100 the brake signal chamber 110 communicates with the brake coolant valve 200 by virtue of a brake apply signal feed conduit 140, and the brake signal chamber 110 also communicates with the hydraulic return system 141 through an exhaust conduit 142. Specifically, the exhaust conduit 142 opens to the brake signal chamber 110 through an exhaust port 143. In the unactuated state of the brake apply valve 100, therefore, the brake apply signal chamber 110 provides a path by which the hydraulic fluid which actuates the brake coolant valve 200 can enter the hydraulic return system 141 to deactivate the brake coolant valve 200 and thereby terminate the flow of cooling fluid to the brake packs 11. The specific, structural details of the brake coolant valve 200 are also hereinafter more fully described.

In the unactuated state of the brake apply valve 100, the brake apply chamber 122 communicates with the brake cylinders 101A and 101B by virtue of a brake apply feed conduit 144. The feed conduit 144 opens to the brake apply chamber 122 through an outlet port 145. The brake apply chamber 122 also communicates with the hydraulic return system 141, but through a second exhaust conduit 146 that opens to the brake apply chamber 122 through an exhaust port 148. The exhaust conduit 146 includes a check valve 149 which allows the actuating pressure to be relieved from the brake cylinders 101 but which assists in preventing the brake cylinders 101 from emptying. By maintaining residual fluid in the cylinders 101, and preferably at some predetermined minimum pressure, the brake cylinders 101 will provide a virtually instantaneous response upon the application of actuating pressure through the brake apply valve 100, as will be hereinafter more fully described.

Before continuing with the explanation of how the residual hydraulic fluid pressure within the cylinders 101 is maintained at a predetermined minimum value to allow instantaneous response, it should be noted that, as previewed in the preceding paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation utilized for general identification of that structural member, component or arrangement. Thus, there are at least two brake cylinders which are generally identified by the numeral 101, but the specific, individual brake cylinders are, therefore, identified by the alphanumeric designations 101A and 101B in the specification and on the drawings. When two quite similar, or even identical, components are closely related to a third component, the two similar components shall be identified by the same numerical designation as the component to which they are related, except that the similar components shall be referenced by virtue of a letter subscript employed in combination with the numerical designation utilized for identification of the related component. These same suffix conventions shall be employed throughout the specification.

As previously noted, the source of hydraulic fluid employed to actuate the brakes may also be the source of the fluid employed to cool the brakes, and that fluid may be stored in a reservoir 56 that is fed by the hydraulic return system 141. A pump 58 is generally employed to supply hydraulic fluid from the reservoir 56 to the brake apply valve 100 at the desired mainline pressure. As shown, the pressurized hydraulic fluid from the pump 58 is fed into the brake apply valve 100 by branches 150$_A$ and 150$_B$ of a supply conduit 150.

Although the check valve 149 is provided to maintain a predetermined minimum pressure for the hydraulic fluid retained within the cylinders 101, it may also be desirable, or necessary, to replenish that fluid from time to time in order to maintain the accepted minimal pressure. Replenishment at the desired, predetermined pressure can be accomplished by proper utilization of the disparate projected areas of the lands 120 and 121 that define the opposed ends of the brake apply chamber 122 in conjunction not only with the check valve 149 but also with a restricted flow cross feed conduit 155 that communicates between the brake apply feed conduit 144 and branch 150$_B$ of the supply conduit 150.

In the unactuated state of the brake apply valve 100, pressurized hydraulic fluid is not provided access to the brake signal chamber 110, but restricted access is provided to the brake apply chamber 122. Specifically, the second land 106 on the first spool member 102 blocks the inlet port 151 by which the first branch conduit 150$_A$ opens through the first, cylindrical, interior wall portion 108 of the housing 104 selectively to feed the brake signal chamber 110. Similarly, the second land 121 on the second spool member 103 blocks the inlet port 152 by which the second branch conduit 150$_B$ opens through the third, cylindrical, interior wall portion 124 of the housing 104 selectively to communicate with the brake apply chamber 122.

However, even in the unactuated state of the brake apply valve 100, pressurized hydraulic fluid in branch conduit 150$_B$ bleeds through the restricted flow cross feed conduit 155 into the brake apply feed conduit 144. This continuous access of pressurized hydraulic fluid between line pressure in the supply conduit 150 and the feed conduit 144 assures that the cylinders 101 will never be empty. At the same time, the differential projected areas of the lands 120 and 121 causes the second spool member 103 to react in response to the pressure reflected in the brake apply chamber 122 from the pressure within the cylinders 101. Hence, when the pressure of the fluid that has bleed into the brake apply feed conduit 144 exceeds a predetermined value, the second spool member 103 responds by translating to open the exhaust port 148. This action of the second spool member 103 assures that the fluid pressure within the cylinders 101 will be maintained at the desired minimum by draining the excess hydraulic fluid from the brake apply chamber 122 past the check valve 149 to the return system 141. The desired residual hydraulic fluid is, therefore, maintained within the brake cylinders 101 so that they will provide instantaneous response when braking action is required.

To continue with an explanation as to the operation of the brake apply valve 100, when the vehicle operator initially depresses the brake pedal 13 the roller 25 on the first output lever arm 22 applies a force against the outwardly directed face 112 on the head portion 111 of the first spool member 102. The force applied by the first output lever arm 22 translates the first spool member 102, as depicted in FIG. 4, when that force is sufficient to overcome the biasing action of the return spring 118. As the first spool member 102 is thus translated, the first land 105 thereon blocks the exhaust port 143, thereby closing communication between the brake signal chamber 110 and the hydraulic return system 141. That same translation of the first spool member 102 also translates the second land 106 away from the inlet port 151 to permit communication between the first branch 150$_A$ and the brake signal chamber 110. Mainline hydraulic pressure is thereupon transmitted through the brake signal chamber 110 and the brake apply signal feed conduit 140 to open the brake coolant valve 200 and allow cooled hydraulic fluid to bathe, and cool, the brake packs 11. This operation of the brake coolant valve 200 is also hereinafter described.

Any hydraulic fluid which may inadvertently accumulate within the recess 133, or the space 153 between the first and second spool members 102 and 103, continuously empties into the hydraulic return system 141 through the third exhaust conduit 154. As the first spool member 102 translates in response to this initial depression of the brake pedal 13, the connecting rod 125 will slide along the axial bore 128 which extends through the second spool member 103, and only the biasing action of the regulating spring 132 will effect translation of the second spool member 103 toward the then displaced retaining cap 129 that determines the extent to which the second spool member 103 can move axially away from the first spool member 102. Although the description of the brake apply valve 100 will now continue, in order to explain how the brake apply valve 100 effects hydraulic actuation of the brake apply assembly 300, it should be understood that in a braking system 10 embodying the concepts of the present invention, the hydraulic actuation of the braking system 10 will occur subsequently to the mechanical actuation thereof, as is required to assure the desired tactile feed back.

As shown in FIG. 5, the regulating spring 132 initially translates the second spool member 103 such that the first land 120 thereon closes the exhaust port 148 by which the exhaust conduit 146 opens through the second cylindrical interior wall portion 123, thereby closing the brake apply chamber 122 to the hydraulic return system 141. As is also represented in FIG. 5, continued translation of the second spool member 103 translates the second land 121 thereon to open the inlet port 152 to permit the introduction of pressurized hydraulic fluid from the second supply branch 150$_B$ into the brake apply chamber 122. The foregoing description delineates an arrangement wherein an "underlap" exists as to the spacing of the lands 120 and 121 relative to the spacing of the respective ports 148 and 152 with which the lands 120 and 121 interact.

It is also possible to space the lands 120 and 121 relative to the ports 148 and 152 such that they are "line-on-line." That is, the lands 120 and 121, and/or the ports 148 and 152, may be spaced such that at the instant one port closes, the other port is opening. Finally, it is possible to effect a disposition which constitutes an "overlap." In an overlap disposition the land 121 would open port 152 just prior to the closure of port 148 by land 120.

These three relationships of the lands to the ports are well known to the art, and they are mentioned herein merely to establish that the brake apply valve 100 will operatively accommodate any of the three relationships to accomplish any of the objectives achieved by those three relationships.

Because the check valve 149 tends to prevent either the brake cylinders 101, or the brake apply feed conduit 144, from emptying, and because the hydraulic fluid necessary to maintain the desired minimal pressure is constantly being replenished through the restricted flow cross feed conduit 155, the pressurized fluid introduced into the brake apply chamber 122 from the branch conduit 150$_B$ is applied virtually instantaneously to the brake cylinders 101 through the brake apply feed conduit 144. As the downstream pressure within the feed conduit 144 increases, that pressure will be reflected in the brake apply chamber 122 to be applied against the projected areas of the lands 120 and 121 which define the opposed, axial boundaries of the brake apply chamber 122.

Because the projected area of land 120 exposed to the brake apply chamber 122 is greater than the projected area of land 121 exposed to the brake apply chamber 122, the hydraulic pressure within the brake apply chamber 122 acts on that differential area to create a force that moves the second spool member 103 against the biasing action of the regulating spring 132. The displacement of the second spool member 103 toward the first spool member 102 will depend upon the relative biasing pressure of the regulating spring 132 in comparison to the differential force applied to the second spool member 103 by the pressure of the hydraulic fluid with the brake apply chamber 122.

As long as the differential force exceeds the biasing action of the regulating spring 132, the second spool member 103 will be urged toward the first spool member 102, even to the point of opening the exhaust port 148 which allows the fluid within the brake apply chamber 122 to exit into the hydraulic return system 141. However, as the pressure within the brake apply chamber 122 falls, the differential force acting on the opposed lands 120 and 121 of the second spool member 103 will be overcome by the biasing action of the regulating spring 132 to close the exhaust port 148 and reopen the second inlet port 152.

It must be appreciated that the translated location of the first spool member 102 directly controls the force which need be applied to the regulating spring 132 by the second spool member 103 in order to effect communication between the brake apply chamber 122 and either the hydraulic return system 141 or the supply branch 150$_B$. Hence, the greater the pressure applied to the brake pedal 13 by the operator to effect translation of the first spool member 102, the greater will be the brake apply pressure required in the feed conduit 144 to open the exhaust port 148 by which to effect communication with the hydraulic return system 141.

As a result, the apply pressure directed to the brake cylinders 101 through the brake apply valve 100 is regulated in response to the amount of force applied by the vehicle operator to the foot pedal 13. In addition, the operator may be continuously supplied with tactile feed-back resulting from this hydraulic actuation of the braking system through the contact of his foot with the pedal 13 so long as the hydraulic actuation occurs after the mechanical actuation has initially applied the brake pack 11. Such tactile feed-back has been found to enhance the operator's visual observation of the vehicular speed reduction in response to his application of foot pressure upon the pedal 13. The interaction of the hydraulic brake application, together with the self-energization of the brake apply system 300, however, can severely degrade the feed-back unless the mechanical actuation is accomplished prior to the hydraulic actuation. The present invention provides the necessary sequencing, as will also be hereinafter more fully described.

Brake Coolant Valve

To reiterate, the brake coolant valve 200 controls the flow of a coolant—normally the cooled hydraulic fluid available from the same source as the hydraulic fluid flowing to, or through, the brake apply valve 100—to the engageable torque transfer device—i.e.: the brake packs 11 employed in the braking system of a vehicle—during their application. The brake coolant valve 200 is actuated by the brake apply signal pressure emanating from the brake apply signal chamber 110 in the brake apply valve 100, as previously described.

Figure 6:
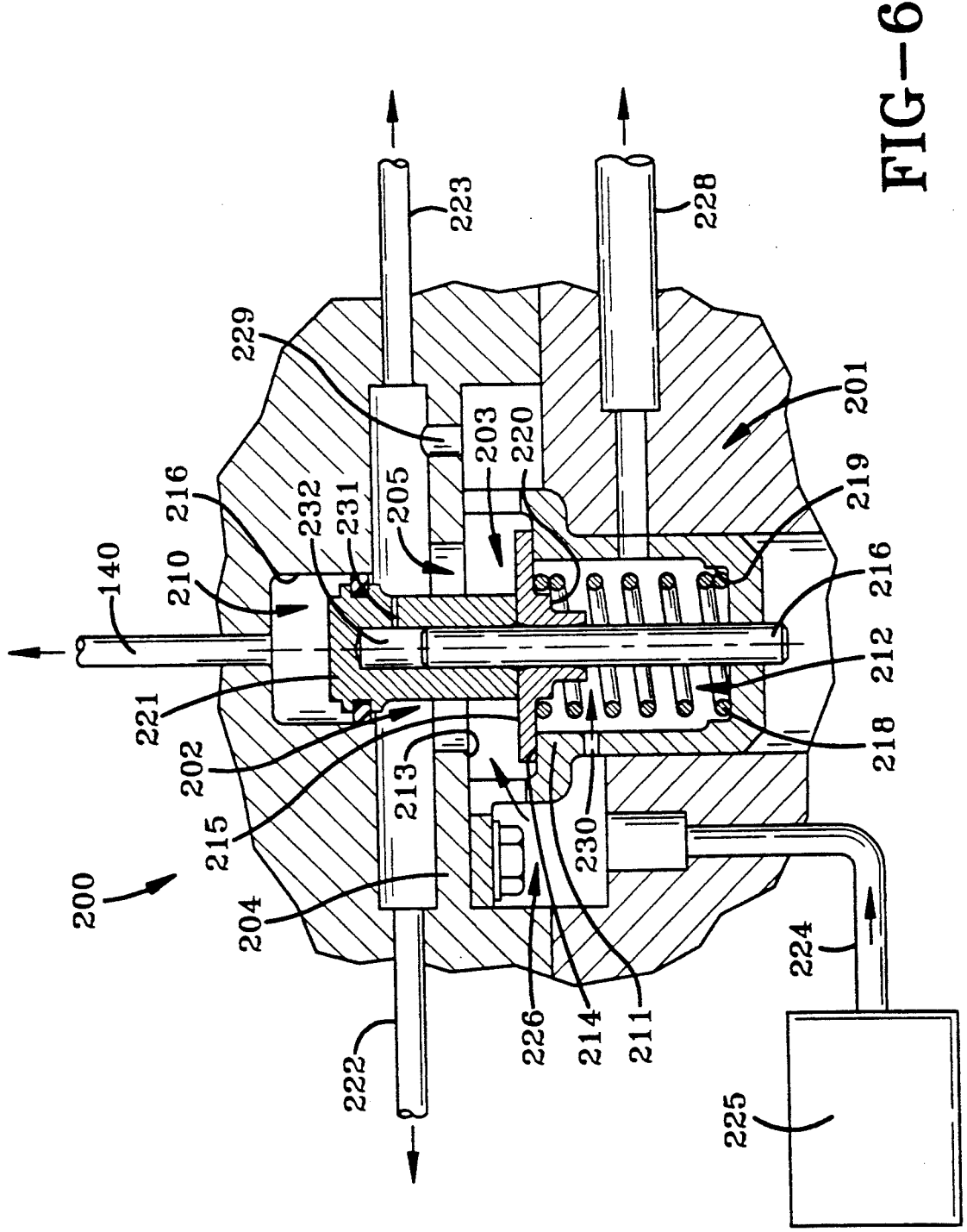
FIG. 6 is an enlarged portion of FIG. 2 depicting the components of the brake cooling valve disposed in response to initial depression of the brake pedal.

The mechanism of the brake coolant valve 200—as depicted in FIGS. 2 and 6—may be contained within a multi-piece housing 201 that may be incorporated integrally with, or be separate from, the housing 104 within which the brake apply valve 100 is received. In either situation, the housing 201 contains a first, or coolant delivery, chamber 202 and a second, or lubricant delivery, chamber 203 separated by a transverse, medial wall 204 that is penetrated by a passage 205 through which communication between the first and second chambers 202 and 203 can be selectively effected. A piston chamber 210 extends axially outwardly from the coolant delivery chamber 202.

A shoulder 211 is presented in axially spaced relation from the medial wall 204 with the coolant delivery chamber 203 disposed between the medial wall 204 and the shoulder 211. A lubricant deliver sub-chamber 212 extends axially outwardly from the lubricant delivery chamber 203 past the shoulder 211. A first valve seat 213 is presented from the medial wall 204 in spaced opposition to a second valve seat 214 presented from the shoulder 211.

A valve element 215 is translatable between the first and second valve seats 213 and 214 along the axis of a pilot pin 216 that is fixedly secured to the housing 201. A compression spring 218 acts between the housing 201 and the valve element 215 to bias the valve element 215 into operative engagement with the first valve seat 213 which circumscribes the passage 205 that communicates between the first and second valve chambers 202 and 203, respectively, within the housing 201 of the brake coolant valve 200. As shown, the compression spring 218 may circumscribe the pilot pin 216 with one end received within a cylindrical anchoring recess 219 in the housing 201 and with the other end received over a centering boss 220 provided on the underside of the valve element 215. The compression spring 218 continuously biases the valve element 215 toward engagement with the first seat 213 in order to preclude flow between the second and the first valve chambers 203 and 202 through the passage 205.

A valve operating piston 221 is received within the piston chamber 210 that extends axially outwardly from the first, or coolant delivery, chamber 202 in the housing 201. The piston chamber 210 communicates with a feed conduit 140 that originates within the brake signal chamber 110 of the brake apply valve 100. The valve element 215 is operatively connected to the piston 221, as by a surface engagement therebetween, such that the valve element 215 translates in direct response to translation of the piston 221. As such, it may prove desirable for the piston 221 to be integral with the valve element 215.

The first chamber 202 communicates with coolant feed lines 222 and 223 that delivers the cooling fluid to the torque transfer device utilized by the hereinafter described brake packs 11. A supply conduit 224 from the cooler 225 communicates with an entry chamber 226 to admit the cooled hydraulic fluid into the second chamber 203. When the brake coolant valve 200 is closed, as depicted in FIG. 1, the main volume of the cooled hydraulic fluid entering the second chamber 203 through the hydraulic fluid supply conduit 224 from the cooler 225 flows into the lubricant delivery sub-chamber 212 and is then discharged through the lubricant distribution conduit 228 which communicates with the sub-chamber 212. In addition, a small portion of the cooled hydraulic fluid entering the second chamber 203 is delivered to the first chamber 202 through a first, restricted orifice 229 in order to provide an uninterrupted supply of cooling fluid with which to bathe the brake packs 11, even when it is not being applied.

When the brake apply valve 100 is operated in response to initial depression of the brake pedal 13, a brake apply signal pressure is provided to the piston chamber 210 in the brake coolant valve 200 from the brake signal chamber 110 in the brake apply valve 100, as previously described. The brake apply signal pressure acts within the piston chamber 210 to translate the operating piston 221 and displace the valve element 215 away from the first valve seat 213 and into sealing engagement with the second valve seat 214, as shown in FIG. 6. This full displacement of the valve element 215 fully opens the passage 205 and thereby permits the cooled hydraulic fluid in the second chamber 203 of the brake coolant valve 200 to flow into the first chamber 202 and out through the feed lines 222 and 223 to the brake packs 11. The resulting unrestricted flow of the cooled hydraulic fluid from the second chamber 203 to the first chamber 202 allows virtually the full flow of the cooled hydraulic fluid through the supply conduit 224 from the cooler 225 to be made available to cool the brake pads when they are being applied.

A second, restricted orifice 230 communicates between the entry chamber 226 and the lubricant delivery chamber 212 to assure that at least a small portion of the cooled hydraulic fluid will be provided for general lubrication, even when the brakes are applied. During application of the brakes, therefore, a continued small portion of the hydraulic fluid is permitted to pass from the entry chamber 226, through the second restricted orifice 230, into the lubrication delivery sub-chamber 212, and from there into conduit 228. This arrangement assures the continued flow of at least a minimal quantity of lubricating fluid to the remainder of the system, even during the application of maximum braking effort.

In order to ensure that the valve element 215 will be properly displaced in response to the application of the signal pressure within the piston chamber 210 it may be astute to provide a relief passage 231 which will allow any fluid that might inadvertently collect within the pilot bore 232 which receives the pilot pin 216 to exit outwardly through the relief passage 231 and not obstruct the operation of the piston 221 or the valve element 215. By selecting a suitable cross sectional area for the relief passage 231 that passage can admit fluid into the pilot bore 233 when the valve is in its unactuated state (FIG. 1), and modestly restrict the exiting flow of fluid from the pilot bore 232, thereby hydraulically dampening the translational opening movement of the valve element 215. By thus damping the translation of the valve element 215 it will not open the passage 205 too quickly nor will the valve element 215 translate in response to any transient spike in the signal pressure applied to chamber 210.

Brake Apply Ramp

A combined, mechanical and hydraulic brake apply assembly 300—which may be incorporated in the braking system 10—is depicted in FIGS. 7 through 11. The brake apply assembly 300 effects the application of brake apply force to the brake packs 11 in response to both mechanically and hydraulically generated forces. The mechanically and hydraulically generated forces may be individually applied, simultaneously applied or applied in selected sequential and/or simultaneous combinations, as is required to achieve the results provided by the present invention. The brake packs 11 are operatively associated with the output shafts 301 of a cross-drive transmission or vehicle. The details of the transmission, being well known to the art, are not depicted in the drawings attached hereto. The brake assembly 300 is received within a brake housing 302 that is typically located linearly adjacent the transmission casing 303 so that rotation of the transmission output shaft 301 can be transmitted to the brake apply assembly 300 received within the brake housing assembly 302. One may, if desired, combine the brake housing 302 with the transmission casing 303, but for simplification of the present explanation they will be deemed to be contiguous, but separate.

The shaft 301 is connected by a spline 307 to a carrier assembly 317 of a planetary gear set 327. The planet carrier assembly 317 has pinion gears 347 which mesh with a ring gear 357 and a sun gear. The sun gear is identified by the spline-teeth 306 formed on a sun gear shaft 304. The sun gear shaft 304 provides an input member for the planetary gear set 327. A sleeve shaft 329 is drivingly connected to the sun gear shaft 304 by teeth 305 and is connectable through teeth 337 to a conventional drive shaft from a transmission, not shown. The sleeve shaft 329 is movable axially to permit ease of connection between the planetary gear set 327 and the transmission in a well known manner. The splineteeth 306 on the sun gear shaft 304 also operatively engage the splines 308 on a hub member 309. A radially outer rim 310 of the hub member 309 is provided with a plurality of axially extending splines 311 operatively to engage the brake pack 11. Actuation of the brake pack 11, as hereinafter explained, will provide a direct connection between the casing 303 and the sun gear shaft 304. This will create a braking effect on the carrier assembly 317, and therefore shaft 301, which will provide slowing of the vehicle.

Figure 7:
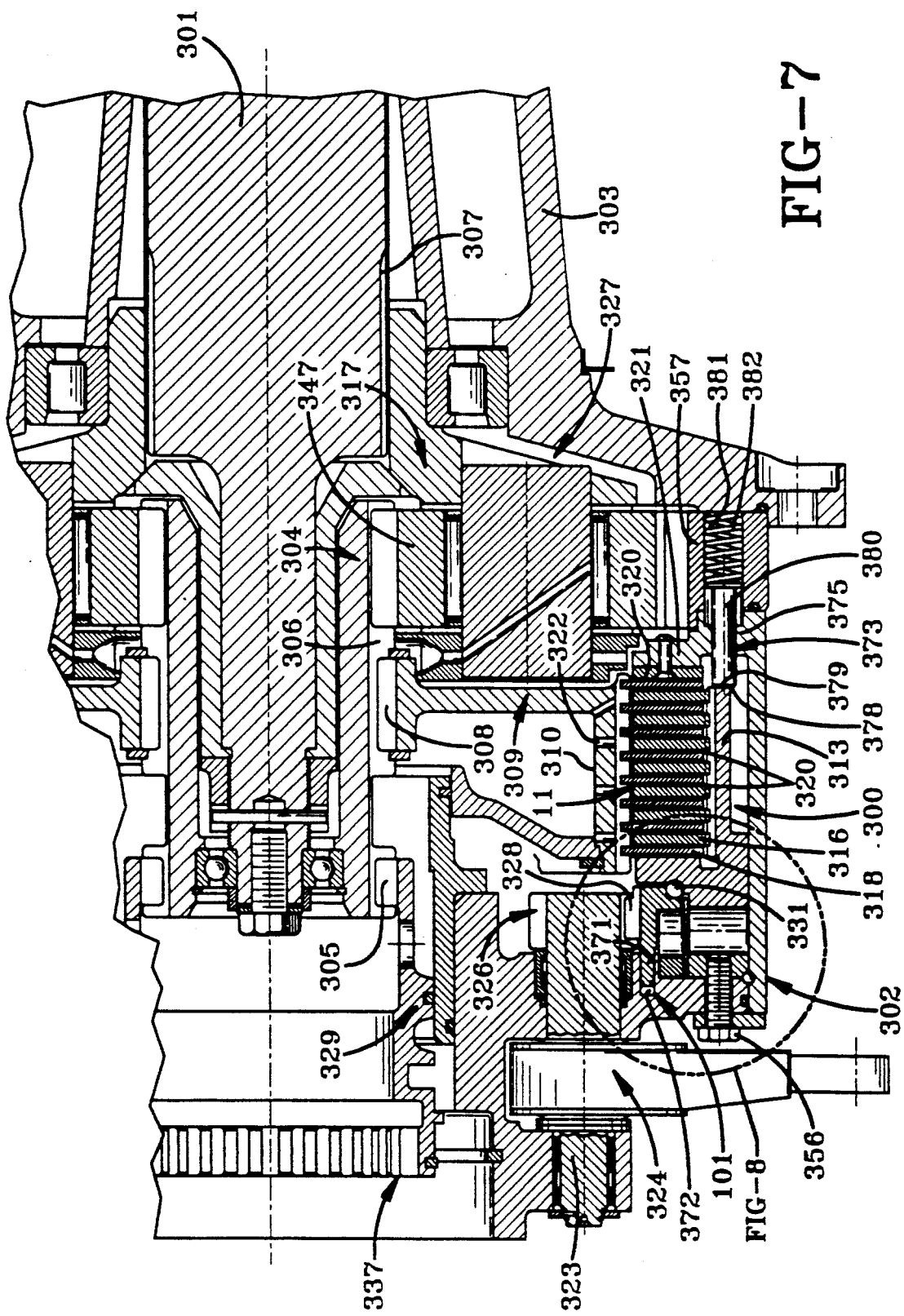
FIG. 7 is a schematic cross section taken axially through that portion of a transmission case which houses a brake assembly that acts upon the transmission output shaft in proximity to its connection with an axle assembly of a vehicle, the cross section depicting a representative brake apply assembly employing opposed camming ramps to effect the mechanical actuation of the brake pack and an actuating cylinder to effect hydraulic actuation of the brake pack, the mechanical and hydraulic actuating systems being compatibly cooperative.
Figure 10A:
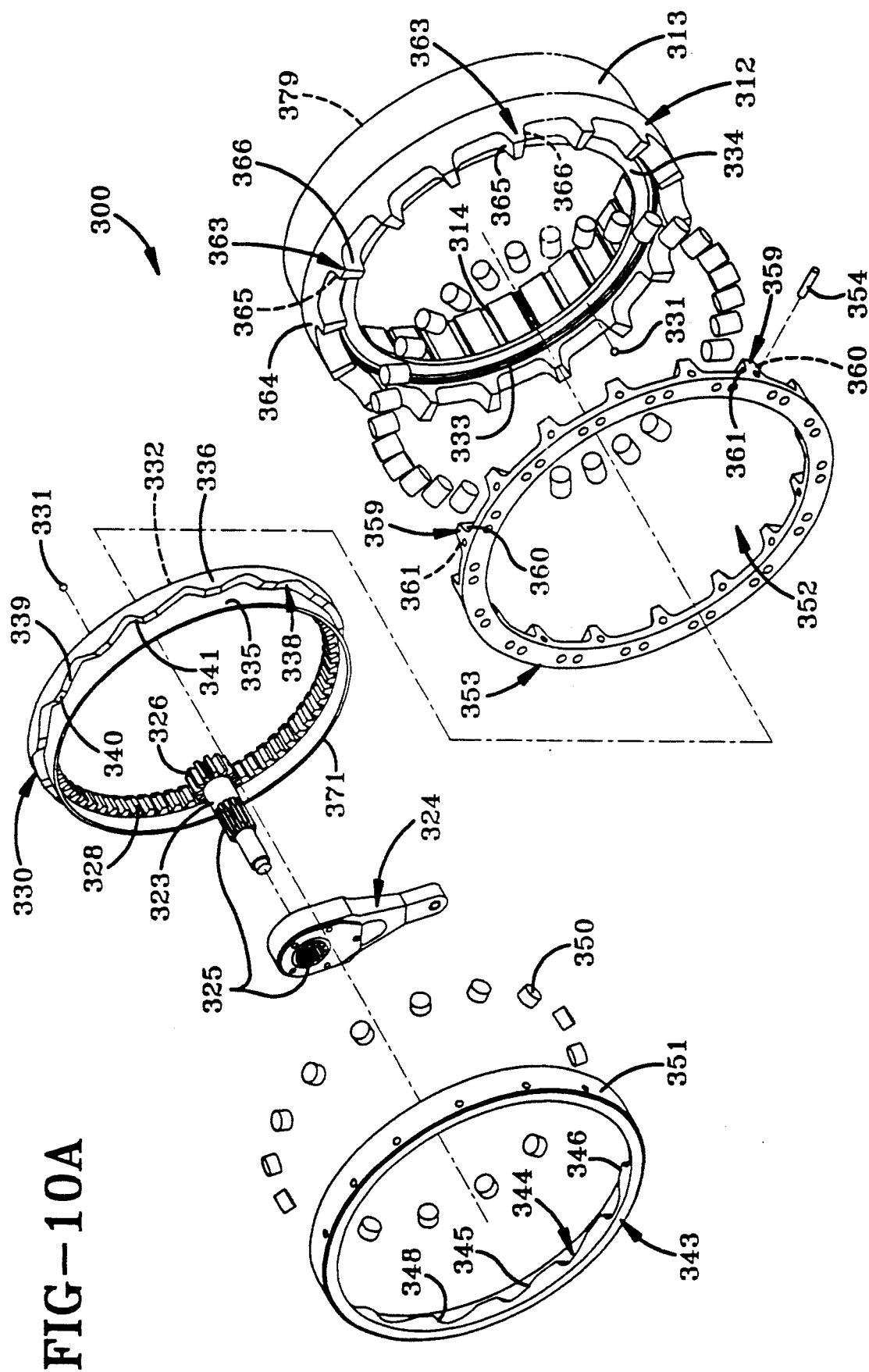
FIG. 10A is an exploded perspective of that portion of FIG. 9 designated as "FIG.-10A" and depicting a portion of the brake apply assembly removed from the housing.
Figure 10B:
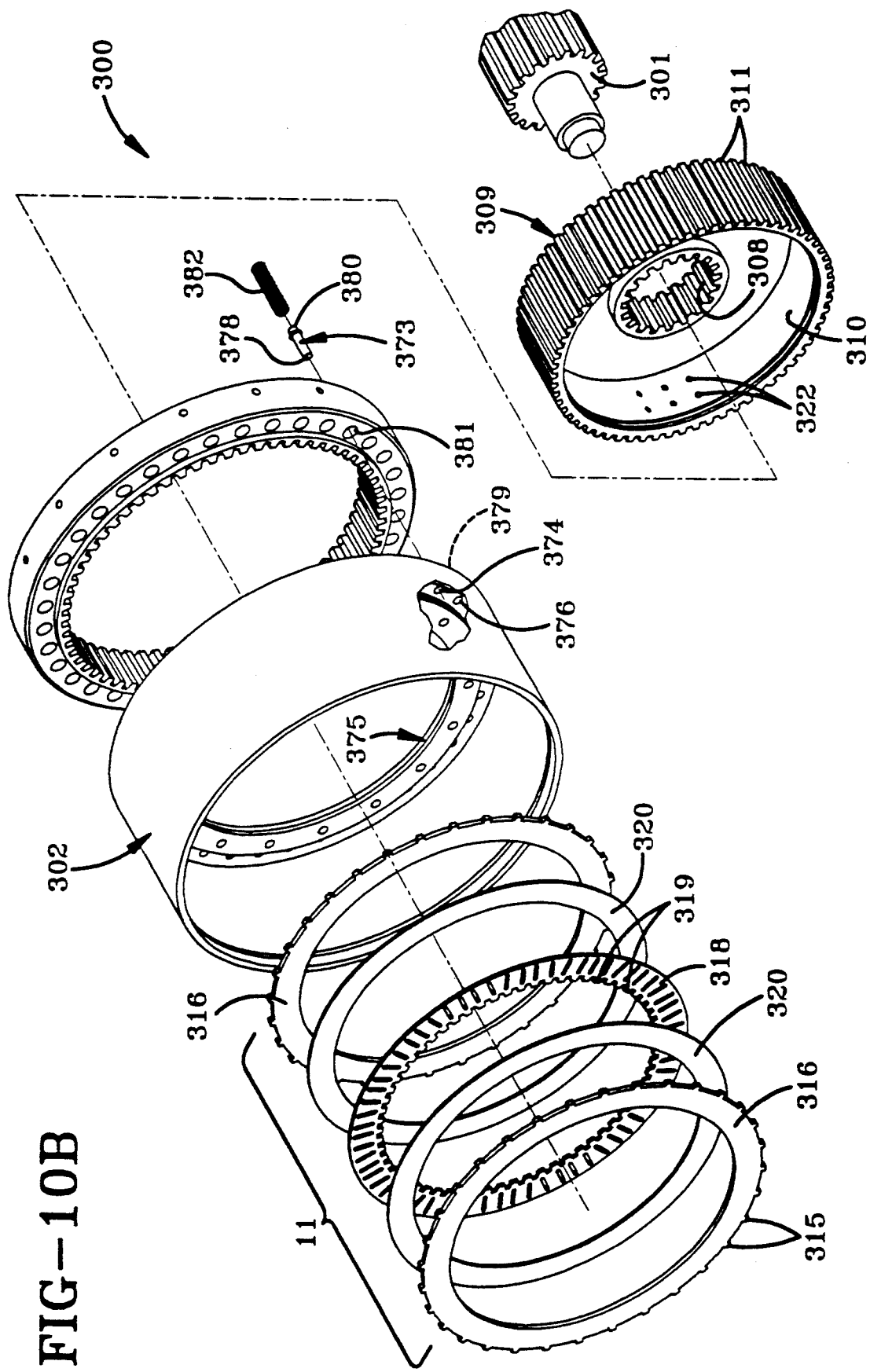
FIG. 10B is an exploded perspective of that portion of FIG. 9 designated as "FIG.-10B" and depicting another portion of the brake apply assembly removed from the housing.

The brake pack 11 is operatively connected between the hub member 309 and a brake apply annulus 312. Specifically, the radially inner surface on the skirt portion 313 of the brake apply annulus 312 may incorporate splines, in the nature of axial slots, as at 314, to receive the mating splines, in the nature of tangs, 315 of the first, annular torque plates 316 and thereby assure that the first torque plates 316 are not relatively rotatable with respect to the brake apply annulus 312. To assure that the interaction between the brake apply annulus 312 and the splines 315 is sufficient to withstand the loading to which the splines 315 may be subjected, a plurality of axially oriented splines, or slots, 314 are employed at circumferentially spaced intervals about the radially inner surface on the skirt portion 313 of the brake apply annulus 312, and the first torque plates 316 are provided with a sufficient number of tang splines 315 to interact with those slot splines 314, as is well known to the art. For simplification of the exploded perspectives only two torque plates 316 are depicted in FIGS. 9 and 10, but as should be appreciated, a plurality of such plates 316 may be stacked in operative relation with the hereinafter described second torque plates 318, as is also well known to the art. As depicted in FIG. 7, seven, first torque plates 316 are interleaved with eight, second torque plates 318.

The splines 311 on the radially outer rim 310 of the hub member 309 are also spaced at circumferential intervals to receive the several splines, in the nature of tangs, 319 which extend radially inwardly from each of the plurality of second, annular torque plates 318 and thereby assure that the second torque plates 318 will not rotate relative to the hub member 309, and thus the transmission output shaft 301, as is also well known to the art.

Annular friction disks 320 are preferably interposed between each of the successive first and second torque plates 316 and 318, respectively. To assure that the several friction disks 320 will not be displaced when they are not compressed between the successive first and second torque plates 316 and 318, a friction disk 320 is, as a general rule, secured to both sides of the alternate first or second torque plates 316 or 318. By thus securing the friction disks 320 to only one of the torque plates 316 or 318 the chance of having any friction disk 320 directly engage another friction disk 320 is obviated. It is, of course, also possible to apply one friction disk 320 to only one side of each torque plate 316 and 318. In this arrangement care must be exercised to assure that only one friction disk is sandwiched between successive torque plates 316 and 318 in order to preclude direct engagement between friction disks 320.

An annular backing plate 321 (FIG. 7) is also preferably supported by the brake housing assembly 302 to provide a fixed member against which the brake pack 11 may be compressed. As shown, one of the friction disks 320 may also be secured to the backing plate 321. The specific interaction and operation of the structural members in the present brake apply assembly 300 by which that compression is effected will be hereinafter more fully explained.

As previously explained, a brake apply valve 100 provides a brake apply signal pressure to operate a brake coolant valve 200 which, as previously described, controls the application of a coolant—normally cooled hydraulic fluid available from the same source as the hydraulic fluid flowing to, or through, the brake apply valve 100—to the torque transfer devices employed in each brake pack 11. In the embodiment depicted, the torque plates 316 and 318 as well as the friction disks 320 constitute a brake pack 11. A plurality of ports 322 extend radially through the rim 310 of the hub member 309 to dispense the cooling fluid radially outwardly over the brake pack 11.

Focusing more specifically on the brake apply assembly 300, which includes the brake apply annulus 312, the apply shaft 323 is rotated by an apply lever assembly 324 (FIGS. 7-10)—through the linkage assembly 26—in response to the application of pressure applied by the operator of the brake pedal 13. As shown, the apply lever assembly 324 may be operatively secured to the apply shaft 323, as by a spline connection 325. A spur gear 326 is provided on the inboard end of the apply shaft 323 meshingly to engage the teeth 328 presented on the radially inner surface of an annular apply cam member 330. The axial orientation of the teeth on the spur gear 326, as well as the axial orientation of the teeth 328 on the annular apply cam member 330 permit relative axial movement therebetween, even while the teeth remain in meshing engagement. The ability of the annular apply cam member 330 to be readily displaced axially with respect to the apply shaft 323 while the two members remain in meshing engagement is quite important to the operation of the brake apply assembly 300 utilizing a toothed input mechanism, as will hereinafter become more fully apparent.

A plurality of ball bearings 331 are interposed between the race 332 (FIGS. 8 and 11) presented from the annular apply cam member 330 and the opposed race 333 provided radially inwardly directed flange 334 on the brake apply annulus 312. As will be hereinafter more fully explained, the ball bearings 331 will effect axial force transfer between the annular apply cam member 330 and the brake apply annulus 312, even though those two components are relatively rotatable. As will be hereinafter described, axial translation of the annular apply cam member 330, for any reason, will, through the application of axial force by the ball bearings 331, tend to effect axial translation of the brake apply annulus 312.

Figure 11:
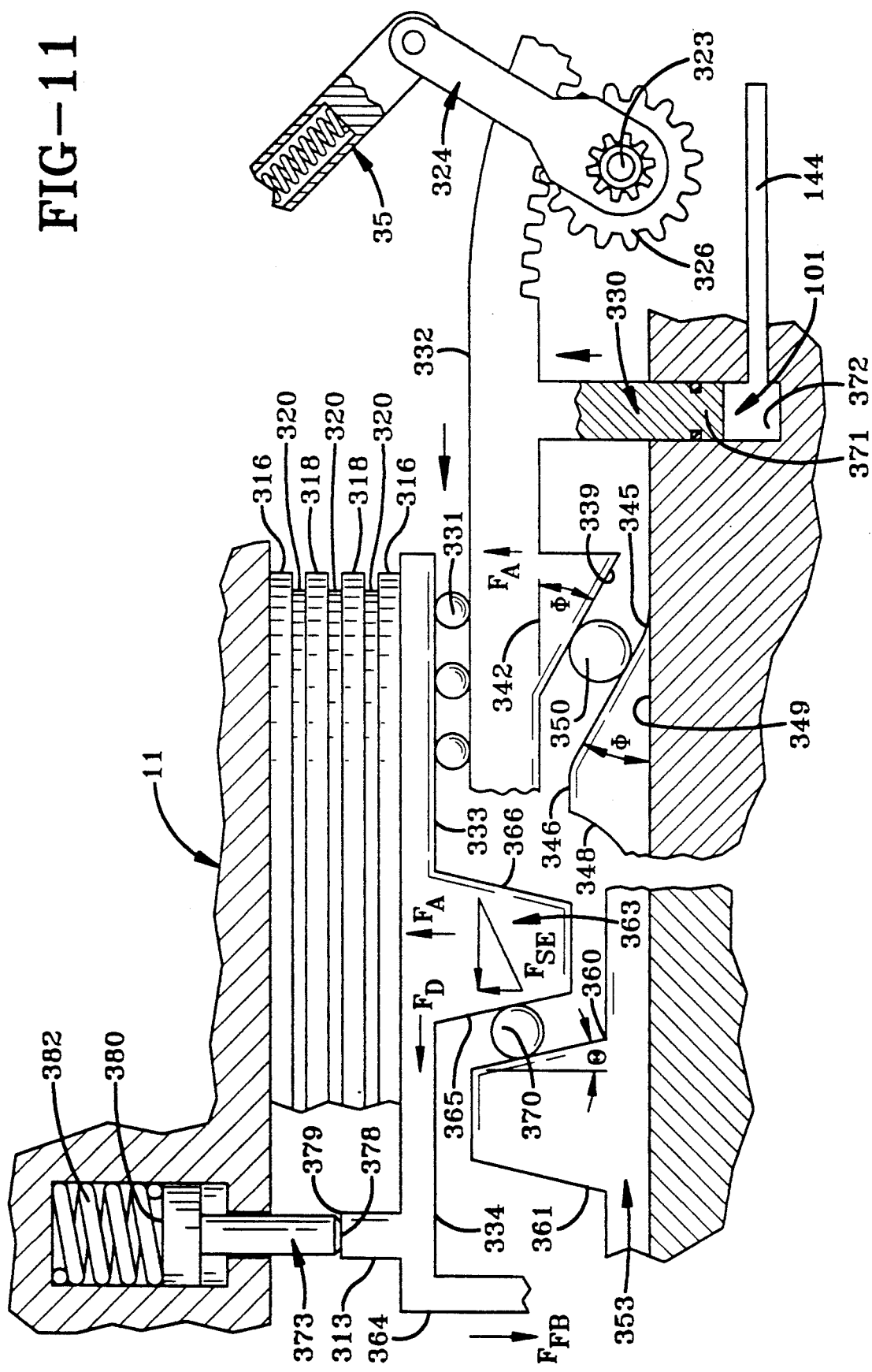
FIG. 11 is a schematic, elevational representation of a portion of the brake assembly to assist in explaining the self-energizing features of the brake assembly as well as the mathematical expressions which delineate that self-energization; and, FIG. 12 is a graphic representation which depicts the improved feed-back resulting from a braking system embodying the concepts of the present invention.

As best seen in FIGS. 9 and 10, the radially outwardly directed surface of the apply cam member 330 is defined by radially offset, cylindrical first and second surfaces 335 and 336, respectively. A camming surface, indicated generally by the numeral 338, extends radially between the first offset surface 335 and the second offset surface 336. The camming surface 338 is comprised of a plurality of axially inclined apply ramps 339—fifteen in the embodiment depicted—disposed between null peaks 340 and return surfaces 341 such that each apply ramp 339 is inclined at an angle $\Phi$ with respect to a circumferential frame of reference 342, as best seen in FIG. 11.

An annular reaction cam member 343 is dispoedd in axial opposition to the apply cam member 330. The reaction cam member 343 presents an axially disposed cam surface, identified generally by the numeral 344. The reaction cam surface 344 also comprises a plurality of axially inclined, reaction apply ramps 345—fifteen in the embodiment depicted—disposed between null peaks 346 and return surfaces 348 such that each reaction apply ramp 345 is also inclined at an angle $\Phi$ with respect to a circumferential frame of reference 349 which is disposed in parallel relation to the circumferential frame of reference 342 on the annular apply cam member 330, as best seen in FIG. 11. One apply roller 350 is disposed between each of the opposed apply ramps 339 and 345 on the apply cam member 330 and the reaction cam member 343, respectively, for a purpose more fully hereinafter described.

A containing skirt 351 extends circumferentially about the reaction cam member 343. The reaction cam member 343, with the containing skirt 351 positioned circumferentially thereabout, is received within the central opening 352 through a response ring 353. A plurality of pins 354 extend radially through the response ring 353, the containing skirt 351 and into the reaction cam member 343 in order to secure those members into a single reaction assembly 355. A plurality of fastening means in the nature of machine bolts 356 (FIGS. 7 and 8) extend through the end wall 358 of the brake housing 302 to be anchored in the response ring 353, thereby securing the reaction assembly 355 to the brake housing 302.

The response ring 353 presents a plurality of circumferentially spaced, axially outwardly extending lobes 359. As depicted, sixteen lobes 359 would represent a typical embodiment. The opposed sides of each successive lobe 359 presents preferably planar self-energizing ramps 360 and 361 that are each inclined at an angle $\Theta$ with respect to an axial frame of reference 362, as represented in FIG. 11. An equal number of virtually identical lobes 363 extend axially outwardly at circumferentially spaced locations about the outer rim 364 of the brake apply annulus 312. The opposed sides of each successive lobe 363 also presents preferably planar self-energizing ramps 365 and 366 that are also inclined at an angle $\Theta$ with respect to an axial frame of reference 368 thereon, as represented in FIG. 11, which is substantially parallel with the axial frame of reference 362 on the response ring 353. There are preferably the same number of lobes 363 on the brake apply annulus 312 as the number of lobes 359 on the response ring 353, although the lobes 359 on the response ring 353 are circumferentially displaced with respect to the lobes 363 on the brake apply annulus 312. This circumferential displacement positions the self-energizing ramp 360 on each lobe 359 in opposition to the self-energizing ramp 365 on lobe 363. Similarly, the self-energizing ramp 361 on lobe 359 is thereby disposed in opposition to the self-energizing ramp 366 on lobe 363. A roller 370 is disposed between each pair of opposed self-energizing ramps 359 and 365 as well as each pair of opposed self-energizing ramps 361 and 366 on the successive lobes 359 and 363.

Figure 8:
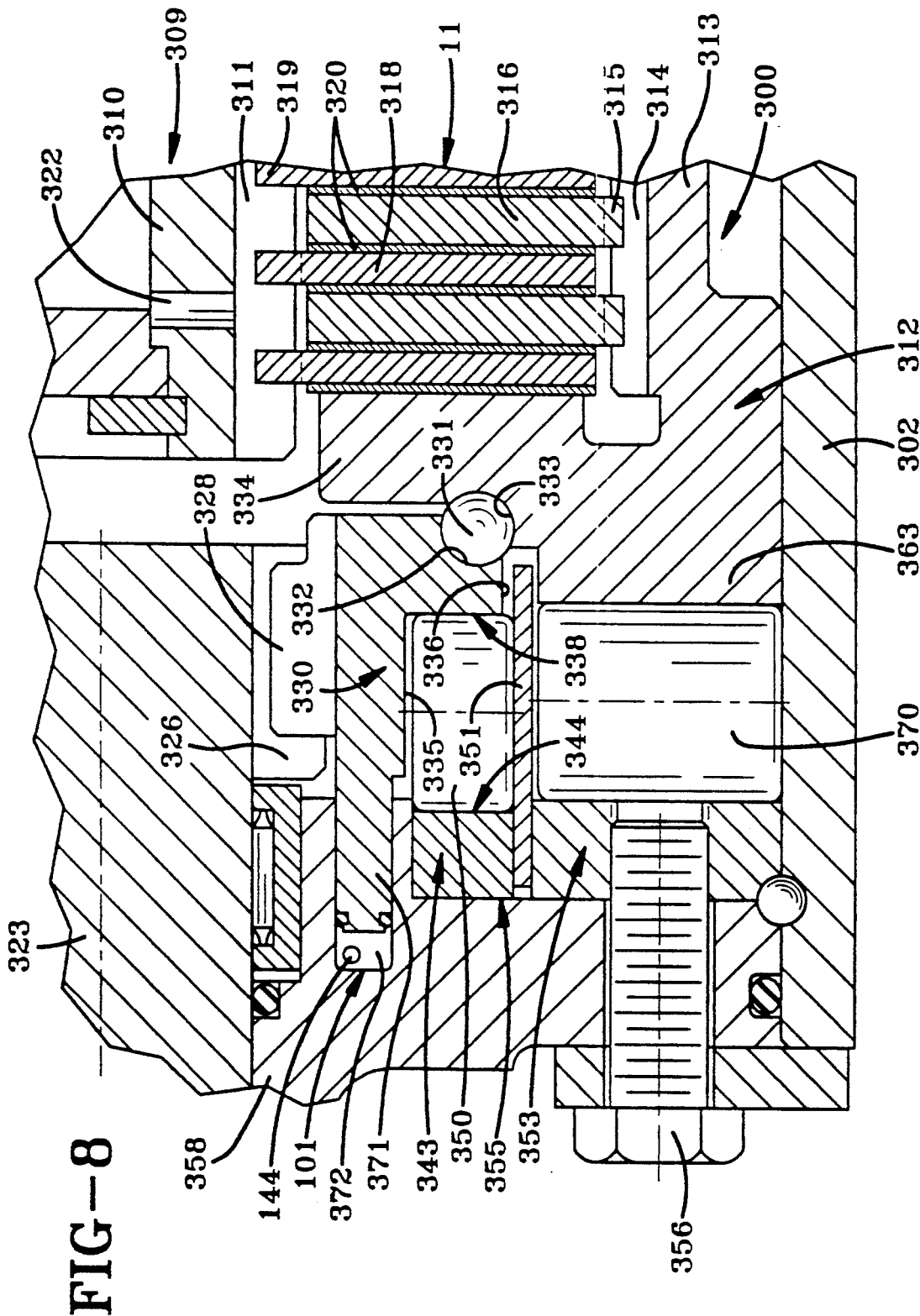
FIG. 8 is an enlarged area of that portion of the schematic cross section of FIG. 7 defined generally by the circle designated as "FIG.-8" therein.

As best seen in FIGS. 8, 9 and 10, an annular piston 371 extends axially outwardly from the apply cam member 330 to be received within a mating, annular piston chamber 372 recessed within the end wall 358 of the brake housing 302. A similar piston chamber is provided for that brake apply assembly 300 utilized with each transmission output shaft 301. As previously described, pressurized hydraulic fluid is applied from the brake apply valve 100 to the brake cylinders 101 through the feed conduit 144.

A plurality of displacement rods 373 are slidably received within a corresponding plurality of bores 374 circumferentially spaced about a support flange 375 that extends radially inwardly from the brake housing 302. The bores 374 may, as shown, alternate with mounting bores 376 which also penetrate the support flange 375. The previously described annular backing plate 321 may also be carried on the support flange 375.

The distal end 378 of each displacement rod 373 extends outwardly from the support flange 375 to engage the end face 379 on the skirt portion 313 of the brake apply annulus 312. The opposite, or proximal, end 380 of each displacement rod 373 is received within a chamber 381 for axial displacement. The chamber 381 contains means by which to provide a biasing protraction of the displacement rod 373 against the end face 379 on the skirt portion 313 of the brake apply annulus 312. As shown, that means may be the biasing action of a compression spring 382.

Operation of the brake apply assembly 300 is initiated when the vehicle operator applies pressure to the brake pedal 13, which effects rotation of the apply shaft 323 by virtue of the linkage assembly 26 interposed between the brake pedal assembly 12 and the apply lever assembly 324. Rotation of the shaft 323, and the spur gear 326 secured thereto, rotates the annular apply cam member 330 and forces the apply ramps 339 to drive the apply rollers 350 against the reaction apply ramps 345 on the reaction cam member 343. Because the reaction cam member 343 is fixedly secured to the brake housing 302, the interaction between the apply ramps 339, the apply rollers 350 and the reaction apply ramps 345 translates the annular apply cam member 330 away from the reaction cam member 343 to drive the ball bearings 331 against radially inwardly directed flange 334 on the brake apply annulus 312, thus also axially translating the brake apply annulus 312 to compresses the associated brake pack 11 between the flange 334 and the backing plate 321.

As the braking action between the interleaved torque plates 316 and 318 begins to take effect, the torque applied to those torque plates 318 rotating with the transmission output shaft 301 by virtue of the vehicular momentum is reflected back to the brake apply annulus 312. The torque is reflected through the interaction of the splines 315 on the first torque plates 316 with the splines 314 on the skirt portion 313 of the brake apply annulus 312. The resulting torque reaction is not, however, applied to the annular apply cam member 330 inasmuch as the ball bearings 331 isolate the annular apply cam member 330 from rotation of the brake apply annulus 312. To the contrary, the torque feed back to the brake apply annulus 312 does react against those rollers 370 located between the ramps 365 or 366 on the lobes 363 of the brake apply annulus 312 which are, by the reflected torque, rotated toward the opposed ramps 360 or 361 on the lobes 359 presented from the response ring 353. The resulting interaction of the ramps on lobes 359, the rollers 370 and the reaction ramps on lobes 363 effects an additional translation of the annular apply cam member 330 away from the reaction cam member 343. This translation also serves to drive the ball bearings 331 against the radially inwardly directed flange 334 on the brake apply annulus 312, thus effecting additional axial translation of the brake apply annulus 312 to compresses the associated brake pack 11 even further. The brake application resulting from the feed-back torque is designated as a self-energizing braking application, and its effect is additive to the brake apply force initially generated by rotation of the annular apply cam member 330.

With continued reference to FIG. 11, an in-depth understanding as to the operation of the mechanical brake apply assembly 300 can be achieved by understanding certain mathematical relationships generated by that assembly. The following mathematical terms are employed to express forces present in the brake assembly:

$F_A$ = The translation force applied by the brake apply annulus 312 in response to the interaction of the annular apply cam member 330 to the brake apply annulus 312 through the apply rollers 350;

$F_{SE}$ = The self energizing force applied to the brake apply annulus 312 in response to the interaction of the lobes 359 on the response ring 353 with the lobes 363 on the brake apply annulus 312 through the rollers 370;

$F_{FB}$ = The return spring force in springs 382;

$F_C$ = The total clamping force applied to the brake pack 11, which can be mathematical expressed as:

$$F_C = F_A + F_{SE} - F_{FB} \quad (1)$$

In order to calculate the total amount of axial clamping force $F_C$ required to generate a braking torque "T", one needs the following additional mathematical terms:

$\mu$ = The coefficient of friction between the torque plates 316 and 318 and the interleaved friction disks 320;
$R_{FP}$ = The mean radius of the friction disks 320; and,
$N$ = The number of friction disks 320.

The axial clamping force $F_C$ can then be calculated by the mathematical expression:

$$F_C = \frac{6T}{(\mu)(R_{FF})(N)} \quad (2)$$

In order to calculte the self-energizing force $F_{SE}$ generated by that torque, one needs the following additional mathematical terms:

$R_{SE}$ = The radius to the center of the self-energizing rollers 370; and,
$\Theta$ = The angle of inclination of the self-energizing ramps 360 and 365 in one direction and 361 and 366 in the other direction.

The self-energizing force $F_{SE}$ can then be calculated by the following mathematical expression:

$$F_{SE} = \frac{12T}{(R_{SE})(\cot\theta)} \quad (3)$$

Finally, one must determine the angle $\Theta$ at which the system will not release—i.e.: the locking angle. The locking angle is the self-energizing ramp angle of inclination $\Theta$ that results in a self energizing force equal to the total force required to sustain the braking torque. In order for the system to release, the braking force must release when the apply force is removed. Otherwise, the brakes would lock every time the brakes were applied and would not release until the vehicle would be brought to a complete stop. Similarly, if the brakes were applied when the vehicle was on a grade, the brakes could not be released without moving the vehicle up the grade. As such, the locking angle $\Theta$ is achieved whenever:

$$F_{SE} = F_C \quad (4)$$

Expanding the foregoing mathematical expression, it will be observed that:

$$\frac{12T}{(R_{SE})(\cot\theta)} = \frac{6T}{(\mu)(R_{FF})(N)} \quad (5)$$

Simplifying, $$\cot\theta = 2N(\mu)\left(\frac{R_P}{R_{SE}}\right) \quad (6)$$

The percentage of self-energization of a system is defined as that percentage of the total apply force that is provided by the self-energization feature. Typically, one would employ something in the range of about thirty percent (30%) self-energization. That is seventy percent (70%) of the clamping force would be derived from the pressure applied to the brake pedal 13 and thirty percent (30%) of the clamping force would be self generated from the system itself.

The higher the ratio of the self-energization braking force with respect to the mechanical apply force applied by the operator through the input mechanism (such as the brake pedal 13), the more difficult the system is to control. That is, a large change in the total clamping force resulting from a small change in the mechanical apply force normally introduces a degree of instability. For that reason, the percentage of self-energization is kept well below fifty percent (50%), with a resulting apply force advantage of below 2:1. Such a ratio generates sufficient total clamping force, but it requires that a reasonable comparable pedal force be applied by the vehicle operator.

The present system is designed to take advantage of the self-energization feature, and yet limit the amount of self-energization to a desired range. This result is accomplished primarily by selection of the inclination angle that is appropriately less than the locking angle $\Theta$. For example, in a representative embodiment wherein the locking angle $\Theta$ is calculated to be 27.5 degrees, the actual angle selected would be on the order of about 13 degrees in order to utilize only about fifty percent (50%) of the self-energization feature. Even so, the brake pedal effort required to stop the vehicle under all conditions is greatly reduced.

The apply system would be designed to impose an equal force to the annular apply cam member 330 associated with each axle, that force being proportional to the pedal force and the linear stroke of the pedal 13. The displacement stroke of the pedal 13 adjusts the total force applied to the brake packs 11 to attain a deceleration rate compatible with the tactile feed back to the vehicle operator through the brake pedal 13. The biasing pressure applied to the proximal end 380 of the displacement rods 373 acts against the mechanical force applied by the self-energization system to assure its release when the pressure applied against the brake pedal 13 by the vehicle operator is release, or reduced.

The biasing force supplied by the springs 382 does not relieve the apply system 300 of any of its load inasmuch as that biasing force is applied to the isolated brake apply annulus 312 and not to the annular apply cam member 330. Hence, the biasing force relieves a portion of the self energizing force at the rollers 370 but does not measurably affect the position of the brake apply annulus 312. The forces supplied by the springs 382 are, however, the main component of the pedal effort described by curve 385.

It must be appreciated that if the hydraulic system were to fail, the mechanical system would only be opposed by the biasing action of the springs 382, and the vehicle could readily be brought to a stop—although at perhaps a somewhat greater pedal pressure than would normally be required. Finally, holding a vehicle on a grade with the engine off (no hydraulic system assist) would take advantage of the self-energization feature.

Operation

To review the objectives of the present invention now than an understanding of the brake apply system as well as the brake apply valve 100 and fluid valve 200 has been imparted, it should be understood that when the hydraulic actuating aspect of the prior art braking systems are applied, the resistance to pedal effort decreases sharply as depicted in FIG. 1. This decrease in pedal effort is a result of the fluid pressure and piston chamber 372 forcing the piston 371 to engage the disks of the brake assembly. When the piston 371 moves axially the action, loading on the annular apply cam member 330 is significantly reduced such that operator senses a change in pedal effort. The change in pedal effort may result in the operator providing greater brake force than necessary and therefore stop the vehicle much more rapidly than desired. However, changing the spring forces already present within the prior art systems will not alleviate the system but may exacerbate it. That is, if the return spring forces 382 are significantly increased the operator pedal effort will be significantly increased and a rapid decrease in pedal effort will be sensed whenever the hydraulic brake apply function is instituted.

When the annular apply cam member 330 moves by other than pure mechanical actuation, the effort required by the operator to depress the brake pedal 13 may be suddenly reduced to a significant degree. When faced with such a sudden reduction in the resistance to depression offered by the brake pedal 13, the natural reaction of the vehicle operator is to apply an even greater force to the brake pedal 13. This additional depression of the brake pedal 13 effects an even further translation of the second spool member 103 in the brake apply valve 100, resulting in an even greater application of mainline pressure to the cylinders 101.

The present invention recognizes that the annular apply cam member 330 must be positioned to effect instantaneous compression of the brake packs 11 in response to the hydraulic actuation of the braking system 300 in order for any feed-back during hydraulic actuation of the braking system 10 to impact reliable information. Accordingly, the present invention provides feed-back to the operator by initially applying the mechanical actuation to a sufficient degree that the annular apply cam member 330 has been displaced to whatever degree is necessary so that further displacement will immediately apply the brake packs 11.

In addition, the hydraulic pressure within the cylinders 101 is maintained to a predetermined value even when the brake apply valve 100 remains unactuated. This also serves to minimize initial, nonfunctional displacement of the annular apply cam member 330 when the brake apply valve 100 actuates the hydraulic aspect of the brake apply system 300.

The aforesaid results are achieved by actuating the mechanical apply aspect of the braking system 300 first, and to such an extent that nonfunctional displacement of the annular apply cam member 330 does not occur in response to the actuation of the hydraulic apply aspect of the braking system 300. The use of the spring biased feed-back link 35 in the linkage assembly 26 contributes to the desired result. The degree to which, and direction in which, the oscillating beam 31 is asymmetrically mounted, together with the "at rest" position of the annular apply cam member 330 prior to the application of hydraulic actuation assists in effecting the desired results.

Under these conditions, even the difference in the projected areas of the lands 102 and 103 on the second spool member 103, which delineate the opposed ends of the hydraulic apply chamber 122 in the brake apply valve 100, will contribute to the tactile feed-back to the vehicle operator.

Moreover, the provision of a stop surface 52 within the feed-back link 35 negates further compression of the spring 46 after the maximum hydraulic brake application has been achieved and permits further mechanical brake application with the direct, tactile feed-back which results from purely mechanical brake actuation. The spring 46 serves to provide the feed-back, or tactile, force perceived by the operator. The initial movement of the second telescopic member 39 relative to the first telescopic member 38 is controlled by the preset load within the linkage assembly 26, or more specifically the spring 46. As previously described, the preset load can be controlled by manipulation of the adjusting member 51. Once this preload force has been reached by the operator, the spring 46 will begin to compress.

The preload force in spring 46 is set slightly greater than required to accommodate the preload force on spring 382, compliance of spring 382 and the brake pack clearance in order to assure brake pack application prior to further compression of spring 46.

When the operator initially depresses the brake pedal to begin mechanical apply of the brakes, the brake pedal effort is operating along curve 385 against the spring 382. During this initial movement, the entire linkage assembly 26 will move as a unit. At the point 386 on the curve depicted in FIG. 12, the second telescopic member 39 will move leftward (as seen in FIGS. 2-5) relative to the first telescopic member 38, thereby further compressing spring 46. It should be appreciated at this point that whatever force the operator applies to the brake pedal will be applied to the brake pad.

Figure 12:
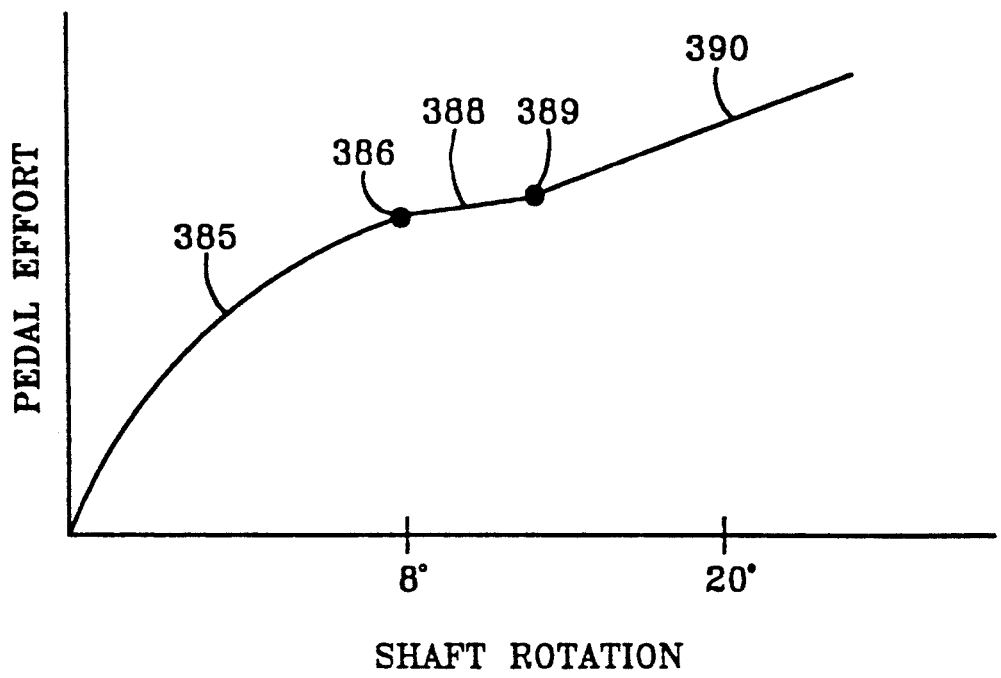

At point 389 on the curve represented in FIG. 12 the hydraulic assist represented by the output pressure from the apply valve 100 is initiated. Thus, from the point 386 to the point 389 on the curve the reactive feed-back, or tactile, forces are reflected along curve 388 and are determined by the spring rate of spring 46. From the point 389 further pedal effort, represented by the curve 390, will be a combination of the increase in force in spring 46 as well as the hydraulic force due to the unbalanced areas present in the hydraulic apply valve 100.

The spring 46 also serves to provide a feed-back transition in the* event the hydraulic actuation system would fail. In that situation the stop surface 52 assures that the input force is directly proportional to the braking action when it becomes necessary to rely solely on mechanical actuation of the braking system 10.

To review the actuation of the braking system 10, when the vehicle operator depress the brake pedal 13, the brake apply valve 100 will be actuated by the initial displacement of the first spool member 102 to initiate the flow of signal pressure from branch $150_A$, through the brake signal chamber 110, the conduit 140 and into the piston chamber 210 in the brake coolant valve 200 and thereby assure that the brake coolant valve 200 will supply the desired cooling bath to the brake packs 11. This operation of the brake coolant valve 200 was described in detail in conjunction with the description of the brake coolant valve 200 that appears previously herein.

Continued depression of the brake pedal 13 will, through the aforesaid linkage assembly 26, rotate the apply shaft 323 to initiate mechanical actuation of the brake packs 11, as previously described herein in conjunction with the explanation attendant upon the structure depicted in FIGS. 7 through 11. Only after the annular apply cam member 330 has initiated the actual braking action in response to the mechanical actuation of the braking system 300 will still further depression of the brake pedal 13 effect actuation of the brake apply valve 100 in the manner depicted in FIG. 4 to provide hydraulic actuation of the brake packs 11, as heretofore described in conjunction with the description of the brake apply valve 100. However, it should be appreciated that the stored force in spring 46 will also increase.

In view of the foregoing description it should be apparent that incorporation of the present invention in the braking system 10 obviates the problem of unreliable tactile feed-back which is inherent in prior art arrangements. This result can be visually observed by a comparison of FIG. 12 with FIG. 1. In FIG. 12 the initial depression of the brake pedal 13 reflects a gradually increasing pedal pressure in response to rotation of the annular apply cam member 330, as represented by portion 385 of the curve depicted in FIG. 12. During this initial pedal depression the brake apply valve 100 is actuated sufficiently to initiate operation of the brake coolant valve 200.

Subsequent to the operation of the brake coolant valve 200, the continued depression of the brake pedal 13 mechanically rotates the annular apply cam member 330 in the brake apply assembly 300 to effect initial operating compression of the brake packs 11. This initial compression of the brake packs 11 is represented by the intersection point 386 on the curve of FIG. 12, and continued mechanical actuation of the braking system 10 is represented by the virtually linear feed-back response represented by portion 388 of the curve, the slope of which is a function of the spring rate of the particular compression spring 46 utilized in the feed-back link 35.

Continued depression of the brake pedal 13 initiates the addition of hydraulic actuation, as represented by the intersection point 389 on the curve of FIG. 12. Thereafter, the combined mechanical and hydraulic actuation results in substantially linear tactile feed-back to the pedal 13 in response to continued brake application. This is represented by the linear curve 390, the slope of which is a function of the spring rate of spring 46 utilized in the feed back link 35 plus the pressure of the hydraulic actuating fluid in the cylinders 101, as reflected in the brake apply chamber 122, in relation to the difference in the projected areas of the lands 102 and 103 on the second spool member 103 in the brake apply valve 100. It will be recalled that the lands 101 and 102 delineate the opposed walls of the brake apply chamber 122.

As should now be apparent, the present invention teaches that a brake actuating system embodying the concepts of the present invention not only provides a reliable tactile feed-back to the vehicle operator through the brake pedal 13 but also accomplishes the other objects of the invention.

We claim:

1. A braking system for a vehicle comprising:
   a brake pedal mounted to be depressed in response to force applied thereto by a vehicle operator;
   a mechanical brake actuating mechanism;
   a hydraulic brake actuating mechanism;
   means selectively to apply said mechanical brake actuating mechanism sequentially in advance of said hydraulic brake actuating mechanism in response to depression of said brake pedal;
   link means incorporated in the means to apply said mechanical brake actuating mechanism in response to depression of said brake pedal;
   said link means providing tactile feed-back to said brake pedal throughout the range of operation of said braking system;
   means to apply said hydraulic brake actuating mechanism in response to continued depression of said brake pedal.

2. A braking system, as set forth in claim 1, further comprising:
   spring means incorporated within said link means.

3. A braking system, as set forth in claim 2, further comprising:
   a stop to restrict the operation of said spring means.

4. A braking system, as set forth in claim 1, further comprising:
   a rocker arm mounted for rotation in response to depression of said brake pedal;
   an oscillating beam operatively interposed between said rocker arm and said link means.

5. A braking system, as set forth in claim 4, wherein:
   said oscillating beam is asymmetrically mounted.

6. A braking system, as set forth in claim 5, further comprising:
   spring means incorporated within said link means.

7. A braking system, as set forth in claim 6, wherein:
   said rocker arm presents an input lever portion that is operatively connected to said brake pedal;
   said rocker arm also presents first and second output lever arms;
   said first output lever arm being operatively connected to said oscillating beam for application of said mechanical brake actuating mechanism;
   said second output lever arm being operatively connected to a brake apply valve in said hydraulic brake actuating mechanism.

8. A braking system, as set forth in claim 7, wherein:
   said first output lever arm terminates in a cam surface; and,
   a cam follower is presented from said oscillating beam to engage said cam surface.

9. A braking system, as set forth in claim 8, wherein said link element further comprises:
   first and second telescopic portions;
   said spring means being interposed between said first and second telescopic portions to resist relative compression therebetween.

10. A braking system, as set forth in claim 9, further comprising:
    a stop to restrict the operation of said spring means.

11. A braking system, as set forth in claim 10, further comprising:
    means to adjust said stop and thereby control the relative compression between said first and second telescopic portions.

12. A braking system for a vehicle comprising:
    a brake pedal operable in response to force applied thereto by a vehicle operator;
    a mechanical brake actuating mechanism;
    a hydraulic brake actuating mechanism;
    means for storing mechanical force disposed between the operator and the mechanical brake actuating mechanism including a preset force within said mechanical force-storing means which is substantially equal to a force supplied by a plurality of return springs disposed within a brake assembly;
    link means incorporating said mechanical force-storing means to actuate said brake actuating mechanism in response to depression of said brake pedal; and,
    means to apply said hydraulic brake actuating mechanism in response to continued operation of said brake pedal.

* * * * *